United States Patent
Bonel et al.

(10) Patent No.: US 10,788,147 B2
(45) Date of Patent: Sep. 29, 2020

(54) PIPE HANDLING SYSTEM AND METHOD OF JOINING PIPE SECTIONS

(71) Applicant: SAIPEM S.P.A., Milanese (MI) (IT)

(72) Inventors: Paolo Bonel, San Donato Milanese (IT); Lorenzo Granelli, San Donato Milanese (IT)

(73) Assignee: Saipem S.p.A., Milan (IT)

( * ) Notice: Subject to any disclaimer, the term of this patent is extended or adjusted under 35 U.S.C. 154(b) by 91 days.

(21) Appl. No.: 15/505,295

(22) PCT Filed: Aug. 21, 2015

(86) PCT No.: PCT/EP2015/069289
§ 371 (c)(1),
(2) Date: Feb. 21, 2017

(87) PCT Pub. No.: WO2016/026969
PCT Pub. Date: Feb. 25, 2016

(65) Prior Publication Data
US 2017/0276260 A1    Sep. 28, 2017

(30) Foreign Application Priority Data

Aug. 22, 2014   (GB) .................................. 1414973.6

(51) Int. Cl.
*B23K 37/053* (2006.01)
*F16L 1/20* (2006.01)
(Continued)

(52) U.S. Cl.
CPC .............. *F16L 1/207* (2013.01); *B23K 31/02* (2013.01); *B23K 37/0282* (2013.01);
(Continued)

(58) Field of Classification Search
None
See application file for complete search history.

(56) References Cited

U.S. PATENT DOCUMENTS 6,273,320 B1 *  8/2001  Siebert ................... B23K 31/02
                                                  228/102
6,352,388 B1 *  3/2002  Seguin .................... B63B 35/03
                                                  405/166
(Continued)

FOREIGN PATENT DOCUMENTS

EP      2 724 808 A1     4/2014
JP      2001009590       1/2001
(Continued)

OTHER PUBLICATIONS

Automation.com article, "OMS Surveys pipe for Technip", Oct. 2011, p. 1-3 (Year: 2011).*
(Continued)

*Primary Examiner* — Devang R Patel
(74) *Attorney, Agent, or Firm* — Buchanan Ingersoll & Rooney PC

(57) ABSTRACT

A method of joining a first pipe section to a second pipe section includes positioning the two pipe sections in an end-to-end configuration to define therebetween a joint to be welded, measuring the degree of alignment of the pipe sections when they are in the end-to-end configuration in a position ready for welding, ascertaining the relative movement required of the pipe sections in order to improve their alignment, effecting the relative movement so ascertained, and welding together the two pipe sections. The method may include the use of geometric data of the end of the pipes in order to ascertain the relative movement required of the pipe sections. A control unit may be used to calculate, using such data, a target orientation that lines up the pipe sections. The measuring step may be performed using, for example, a laser or a camera and backlight.

12 Claims, 8 Drawing Sheets

(51) Int. Cl.
  *B63B 35/03*   (2006.01)
  *F16L 1/19*    (2006.01)
  *F16L 13/02*   (2006.01)
  *B23K 37/02*   (2006.01)
  *B23K 31/02*   (2006.01)
  *G01B 11/25*   (2006.01)
  *B23K 101/10*  (2006.01)

(52) U.S. Cl.
  CPC .......... *B23K 37/0533* (2013.01); *B63B 35/03* (2013.01); *F16L 1/19* (2013.01); *F16L 1/205* (2013.01); *F16L 13/02* (2013.01); *G01B 11/2518* (2013.01); *B23K 2101/10* (2018.08)

(56) References Cited

U.S. PATENT DOCUMENTS

| | | | | |
|---|---|---|---|---|
| 7,189,028 | B1* | 3/2007 | Signaroldi | B63B 35/03 |
| | | | | 405/166 |
| 7,713,000 | B2* | 5/2010 | Verkuijl | B23K 37/0533 |
| | | | | 405/170 |
| 7,815,093 | B2* | 10/2010 | Hees | F16L 1/19 |
| | | | | 228/103 |
| 2005/0087586 | A1 | 4/2005 | Vermaat | |
| 2011/0198316 | A1* | 8/2011 | Legori | B23K 37/0531 |
| | | | | 219/61.1 |
| 2012/0174372 | A1 | 7/2012 | Dagenais | |
| 2015/0116728 | A1* | 4/2015 | Lacome | G01B 11/002 |
| | | | | 356/601 |

FOREIGN PATENT DOCUMENTS

| | | | |
|---|---|---|---|
| WO | WO 2006/112689 | A1 | 10/2006 |
| WO | 2008030079 | A1 | 3/2008 |
| WO | 2009126023 | A1 | 10/2009 |
| WO | WO 2009/148304 | A1 | 12/2009 |
| WO | WO 2010/046390 | A1 | 4/2010 |
| WO | WO 2011/067589 | A1 | 6/2011 |

OTHER PUBLICATIONS

UT3 magazine, Society for Underwater technology, May 2012, p. 56-57 (Year: 2012).*

International Search Report (PCT/ISA/210) dated Oct. 30, 2015, by the European Patent Office as the International Searching Authority for International Application No. PCT/EP2015/069289.

Written Opinion (PCT/ISA/237) dated Oct. 30, 2015, by the European Patent Office as the International Searching Authority for International Application No. PCT/EP2015/069289.

UK Search Report dated Jan. 28, 2015, by the United Kingdom Patent Office in corresponding UK Application No. GB1414973.9. (4 pages).

* cited by examiner

PIPE HANDLING SYSTEM AND METHOD OF JOINING PIPE SECTIONS

FIELD OF THE INVENTION

The present invention concerns a pipe handling system and a method of joining pipe sections. More particularly, but not exclusively, this invention concerns a pipe handling system and method of joining pipe sections in a pipeline laying vessel.

BACKGROUND OF THE INVENTION

Pipelines for the transportation of oil and gas must often be laid at sea. Typically, when laying a pipeline at sea, one end of the pipeline is held by a pipeline laying vessel and a section of pipe is welded onto the end of the pipeline. The lengthened pipeline is then lowered and the process can be repeated. During the laying process the pipelines are subject to high tensile loads due to the weight of the pipeline below the pipe laying vessel. The pipelines may also be subject to fatigue loading due to the action of the sea and the pipeline laying vessel. Additionally, in some applications, the pipeline remains suspended throughout the lifetime of the pipeline and is continuously subjected to marine currents and movements which lead to further fatigue stress. To withstand this loading and stress the weld joints between adjacent pipe sections typically need to be of a high quality.

The quality of the weld is significantly affected by the alignment of the pipes in the vicinity of the weld. Therefore, it is highly desirable to measure the degree of alignment before and/or after welding has taken place to ensure the alignment is sufficient.

A measure of pipe alignment, at a given location on the joint, is the "high-low value" (or just "hi-lo"). The hi-lo is the distance, in the radial direction, between two corresponding positions on two adjacent pipe end-faces.

Pipelines are typically bevelled prior to welding. Depending on the reference point it is thus possible to refer to several different hi-lo values. FIG. 1a shows a partial cross section view of two pipe sections 10a, 10b arranged end-to-end, with the exterior E of the pipe being uppermost in FIG. 3a and the interior I of the pipes being lowermost. The pipes are bevelled so that a joint 14 to be welded is defined between the ends of the pipe sections. FIG. 1a shows: the hi-lo d1 at the weld cap on the outside diameters of the pipe ends (the "external cap hi-lo"); hi-lo d2 at the weld root, between the outside diameters of the bevel noses 12a, 12b (the "external root hi-lo"); and hi-lo d3 between the inside diameters of both pipe ends (the "internal hi-lo"). In a particular radial direction the values of hi-lo d1, d2, d3 may differ due to slight differences in the pipe thicknesses or bevel geometry of the two neighbouring pipe ends 10a 10b. The hi-lo value may also vary around the circumference of the pipes. This may be due to misalignment of the pipes' axes and/or deviations of the pipes' perimeters from a circular shape ("Out of Roundness" which may sometimes be abbreviated to "OOR"). It is recognized that the most important hi-lo measurement to ascertain and to seek to reduce and/or minimize is the internal hi-lo d3 between the inside diameters of the pipes' ends.

Furthermore, a "gap" may exist between the end faces of the pipe sections prior to welding. The "gap" may be defined as the distance between two pipe end faces in a direction approximately parallel to the axes of the pipe sections. The gap may vary around the joint to be welded in both the radial distance from the pipes' axes and around the circumference of the pipes' end faces. It will be appreciated that a gap of zero will indicate that the pipe sections are touching at that point. By way of example, FIG. 1b shows a gap d4 between the outer edge of the bevel nose 12a of the pipe section 10a and an opposing position on the end face of pipe section 10b.

When two pipe sections are arranged in an end-to-end configuration prior to welding, a gap may exist for a number of reasons. For example, the two pipe sections may not be arranged close enough to each other, the axes of the two pipe sections may not be exactly aligned, the end face of a pipe section may not be flat, the end face of a pipe section may not be exactly perpendicular to the pipe's axis, or a contaminant may be present between the end faces of the pipe sections preventing then from coming together. The quality of the weld may also be affected by any gap at the point of welding, particularly if the welding process is performed on the basis that the pipe end faces are uniformly in contact with each other.

When laying pipelines in deep water a process called "J-Lay" may be employed. During the J-Lay process the end of the pipeline is held in a substantially vertical position by the pipeline laying vessel. The pipe then forms a large J-like shape before touching down on the seabed. The new pipe sections will typically be held above the pipeline in a suitable tower, known as a J-Lay Tower, for welding. Heavy-duty clamps are required both for holding the pipeline that extends into the sea and for holding the new pipe section to be welded to the end of the pipeline.

In a typical J-Lay process, new pipe sections are manually aligned to the end of the pipeline on the basis of visual measurement performed by a human operator. The positions of the pipes' bevels are visually checked by the operator and, if misaligned, the relative positions of the pipes are changed by the operator to improve their alignment. This alignment process can take a considerable amount of time, and requires there to be a skilled man-in-the-loop (the experienced operator). Pipeline laying operations at sea typically have high running costs; as a result it is desirable to reduce the time it takes to align pipes in a position ready for welding in order to increase the rate at which the pipeline can be laid. It is, alternatively or additionally, desirable to increase the accuracy of alignment. Reducing the internal hi-lo will improve the accuracy of alignment. Improving the accuracy of alignment will improve the quality of the weld. Further, reducing any residual gap between pipes may also improve the quality of the weld. Ensuring extremely high weld quality and confidence in that quality is of the utmost importance when laying gas/oil pipeline at sea in circumstances when the pipeline will be under very high tension and/or will be subject to significant fatigue loading when being laid and/or when operational.

Certain prior art methods of aligning pipes typically involve calculating or measuring the hi-lo value. Some also involve automatically aligning the pipes. Examples of such prior art methods are described below by way of example.

International Patent Application Publication Number WO2006/112689 discloses an apparatus and method for positioning ends of pipe sections relative to each other. In one embodiment the pipe sections are arranged in an end-to-end configuration by pipe manipulators arranged to the exterior of the pipes. The pipes are held so their ends are slightly spaced apart. The hi-lo is measured whilst the pipes are so held apart. Once the measurements have taken place, the pipes are moved relative to each other to attain a target alignment; during which pipe ends are brought into contact with each other ready for welding. A disadvantage of WO2006/112689 is that welding is performed after the pipes are moved from the position in which their alignment is measured. The alignment during welding may then be subject to error, for example because of uncertainty in the movement of the actuators that manipulate the pipe sections, or because of conditions differing/changing as between the time and positions of the pipes when being measured when spaced apart and the time and positions of the pipes when having been moved and, supposedly aligned, ready for welding. The relevance and usefulness of the alignment measurement may therefore be compromised. As a result alignment problems may potentially be revealed after welding, possibly leading to rejection and/or re-welding of the joint.

International Patent Application Publication Number WO2009/148304 discloses a system for joining two pipe sections. The pipe sections are arranged in an end-to-end configuration with their ends spaced apart. A measuring device, inserted between the two pipe sections, measures geometrical data from the pipes bevels. The geometrical data is processed and provides a target for the relative positioning of the two pipes for welding. The actuators subsequently move the pipes to the target position. The above method requires that the alignment be checked after the actuators have positioned the pipe sections. A disadvantage of this is that the method requires a plurality of measurement systems to be employed when the pipes are on the tower.

International Patent Application Publication Number WO2010/046390 discloses an Internal Line Up Clamp (ILUC) which includes a hi-lo measurement system. The pipe sections are clamped together ready for welding and an internal hi-lo measurement is taken around the circumference of the pipes. In the system of WO2010/046390, the hi-lo is measured when the pipes remain clamped in position for welding. However in practice ILUCs have restricted space, and operate in harsh environmental conditions (being in the pipe interior during the welding process), so that there are limitations on the type and size of hi-lo measurement system that can be integrated with the ILUC. In some cases it may not even be possible to fit any useful instruments on an ILUC. Furthermore, the ability of an ILUC to assist in the line-up and manipulation of the position of the pipes is reduced in the case where the pipes axe suspended vertically, as would be typical in a J-lay system.

The present invention seeks to mitigate one or more of the above-mentioned problems/disadvantages. Alternatively or additionally, the present invention seeks to provide an improved pipe handling system and method of joining pipe sections.

SUMMARY OF THE INVENTION

The present invention provides, according to a first aspect, a method of joining the end of a first pip, section to the end of a second pipe section. The method includes a step of positioning the two pipe sections in an end-to-end configuration to define therebetween a joint to be welded. The method includes a step of taking, by means of a measurement system positioned outside the pipe sections, measurements from which the degree of alignment of the pipe sections in the region of the joint may be ascertained. The measurements are taken when the pipe sections are in the end-to-end configuration in a position ready for welding. The method includes a step of ascertaining, on the basis of the measurements made, the movement required of one of the pipe sections relative to the other in order to improve their alignment. The method includes a step of effecting the relative movement so ascertained so as to improve the alignment of the pipe sections. The method may also include the step of then welding together the two pipe sections.

The method is particularly suited for use when laying pipeline at sea from a vessel as part of a J-lay method. Alignment of pipes in an J-lay system may be effected more easily as a result of the absence of, and lack of a need for, heavy duty pipe clamps. The first pipe section may for example comprise the end of a pipeline, for example a subsea pipeline. It may be the case that at least part of the pipeline, after it has been installed, remains suspended in the water during its lifetime, such that for example the pipeline is subject to fatigue loading via the action of marine currents. Such a pipeline may be in the form or a subsea catenary riser. The second pipe section may comprise a pipe string for welding onto the end of the pipeline. It will be known that a pipe string typically comprises two, three or four pipes welded together to form the string. The method of joining the end of a first pipe section to the end of a second pipe section may be performed as part of a method of laying pipeline into a body of water from a floating vessel, for example as a part of a J-lay process. The step of taking measurements may be performed in a J-lay tower.

The method of joining pipe sections, according to the first aspect, provides a method in which the alignment of the pipes may be ascertained in the final position immediately before welding. It will be appreciated that the step of positioning the two pipe sections in end-to-end configuration to define the joint to be welded will typically result in the ends of the pipe sections directly abutting each other. There may, despite the pipe ends being in direct contact, be certain regions around the circumference of the pipes where the pipes are nevertheless spaced apart by a small gap (say, no more than 0.2 mm), as a result of the pipe-ends not being perfectly flat. The conditions in which the alignment is ascertained may be very close to, if not identical to, the conditions in which the pipes are welded. It is preferred for example that, between the step of effecting the relative movement to improve the alignment of the pipe sections and the step of welding, not only are the pipe sections not moved again relative to each other but also that the pipe sections are not moved, relative to the vessel or structure from which the pipelines are being laid. Accurate alignment of the pipes once welded and the confidence of the accuracy of alignment may thus be improved. The chances of producing an unsuitable joint may thus be reduced. Knowledge and correction of any miss-alignment, for example as determined by a hi-lo measurement, may thus result in higher quality welds and fewer instances of weld rejection.

Furthermore, the method of joining pipe sections may be such that only one measurement system (for measuring alignment/hi-lo and possibly also gap between pipe sections), positioned to the exterior of the pipe is required. This may allow a time- and/or cost-saving as only one measurement system may be needed to take the hi-lo measurements during the time the pipes are within the J-Lay tower. Additionally, because the measurement system may be to the exterior of the pipes, the use and provision of such a measurement system can be effected without needing to interfere with an ILUC inside the pipe sections.

Pipe handling equipment may be used to manipulate the relative position of the first pipe section relative to the second pipe section. Such pipe handling equipment may for example include one or more moveable clamps. The pipe handling equipment may be arranged to move the second pipe section, for example relative to the vessel from which pipeline is being laid. The pipe handling equipment may be arranged to effect translational movement of the second pipe section relative to the first pipe section in the "x" and "y" directions and also rotational movement of the second pipe section relative to the first pipe section about an axis substantially parallel to the axis of the second pipe section. (It will be understood that the "x" and "y" directions are two orthogonal directions being transverse to the axis of the second pipe so that the pipe handling equipment has the ability to maneuver the second pipe section relative to the first pipe section with sufficient degrees of freedom to attain all relative positions of the second pipe section relative to the first pipe section as might reasonably be required in the field to achieve an acceptable low hi-lo measurement, once the axes of the ends of the first and second pipe sections are arranged to be parallel). It will be appreciated that the same pipe handling equipment may also be arranged to effect relative translational movement of the second pipe section towards or away from the first pipe section, for example in a direction along the axis of the second pipe section. The same pipe handling equipment may also be arranged to effect rotation of the second pipe section about one axis, or two orthogonal axes, transverse to the axis of the second pipe section, thereby changing the angle between the axis of the first pipe section and the axis of the second pipe section. Rotation of the second pipe section about an axis transverse to the second pipe section may be achieved by clamping the pipe section with an upper set of clamps and a lower set of clamps, then changing the position of one set of clamps relative to the other set of clamps. The pipe handling equipment may comprise one or more moving clamps. The pipe handling equipment may comprise one or more controllable actuators.

The step of making measurements from the exterior of the pipeline may be in the form of measuring the hi-lo step from one pipe section to the next in the region of the throat of the circumferential groove defined by the bevelled free ends of the pipe section.

It will be appreciated that the taking of a hi-lo measurement from the exterior of the pipe section, when those pipe sections are already in a position ready for welding, precludes directly measuring the internal hi-lo distance, which as acknowledged above is believed to be the critical hi-lo distance to measure and ensure is kept below an acceptable threshold distance. However, it has been appreciated that the difficulties that might arise from not having the ability to directly measure the internal hi-lo distance can be mitigated against and/or avoided by means of the bevel having a prescribed shape and geometry that can be assured as being accurate within acceptable tolerances. The bevel may for example have a known shape to which a known tolerance such that the relationship between the actual internal hi-lo and the measured external hi-lo distance, as measured by the present method, is known within an acceptable tolerance, for example to within +/−2 mm of perhaps +/−1 mm. It may be possible for the relationship between the actual internal hi-lo and the measured external hi-lo distance to be known within a few tenths of a millimetre, for example +/−0.2 mm or 0.1 mm. The present invention may comprise a step of bevelling the pipes so that the bevel shape is machined to a given shape within a tolerance of less than 2 mm, preferably within a tolerance of less than 1 mm, and yet more preferably to within a tolerance of less than 0.5 mm. It is preferred for the bevelling machine to have an accuracy of a few tenths of a millimetre, so the difference between the internal and external hi-lo is at most a few tenths of a millimetre. The accuracy of the bevelling machine may be increased by checking the status and position of the cutting edge more frequently during use. Having such an accurate machining process for the bevelling step may enable the ability to use an external hi-lo measurement as an indirect measure of the internal hi-lo parameter. It may be possible for bevelling to be conducted on-shore or aboard a pipeline laying vessel.

Thus the invention permits a method of aligning pipes in which the step of ascertaining the movement required in order to improve the alignment of thy first and second pipe sections is conducted on the basis that the hi-lo on the internal surfaces inside the pipe-sections should be lees than a first threshold value, and wherein the maximum hi-lo on the internal surfaces of the pipe sections is inferred from measurements of the hi-lo on the root of the joint to be welded and information concerning the manufacturing tolerances relating to the geometry of the bevels of the pipe sections.

There may be a step of measuring any gap or gaps between the end faces of the pipes. It may be beneficial to measure the gap prior to welding to ensure it is not undesirably large at any point. If an unacceptable gap, gaps, average gap and/or distribution of gaps is present at the joint to be welded then the relative alignment of the pipe sections may be altered (or the pipe section rejected). Knowledge and correction of any gap may result in higher quality welds and fewer instances of weld rejection.

The step of positioning the two pipe sections in an end-to-end configuration to define therebetween a joint to be welded may be performed in a manner that is intended to provide approximate alignment of the pipe sections.

The steps of the method are preferably performed in the order they are set out in claim 1.

The step of ascertaining the movement required of one of the pipe sections relative to the other in order to improve their alignment is preferably conducted electronically for example by means of a computer processor or other electronic circuit. A control unit may be provided for the purpose of ascertaining the movement required.

The step effecting the relative movement to improve the alignment or the pipe sections is preferably conducted in response to electronic signals and/or data obtained during performance of previous steps of the method, for example obtained by means, at least in part, during one or both of the step of taking the measurements of the degree of alignment of the pipe sections and the step of ascertaining the movement required to improve the alignment of the pipe sections. A control unit may be provided for the purpose of controlling and/or effecting the relative movement.

The initial positioning of the two pipe sections in an end-to-end configuration may be controlled manually by a human operator. The operator may position the pipes whilst receiving visual input from a camera. The operator may position the pipes whilst receiving feedback from a control unit. The initial positioning of the two pipe sections in an end-to-end configuration may be achieved automatically using actuators and sensors on the pipe handling equipment. For example, the initial positioning may be effected automatically by using a pipe end position measurement system which employs fixed cameras or laser profilers, which way be on the walls of the welding station, to indicate the pipe alignment. An advantage of automated initial positioning is that it may speed up pipeline laying operations. The initial positioning may not be precise enough to immediately effect welding. For example there may be a residual hi-lo and gap of a few centimeters, but this may be sufficient to achieve coupling of the pipes and a suitable preliminary pipe line up, for example to allow for insertion of an ILUC between the pipe sections.

An ILUC may be inserted into the pipe. An ILUC inserted into the pipes may operate some or all of its clamps. Inserting art ILUC may provide further support to the pipe sections during alignment and/or welding. The ILUC may form part of the pipe handling equipment mentioned above. It is preferred however that the principal means for maneuvering the pipe sections relative to each other is provided by means of pipe handling equipment separate from the ILUC. For example, it is preferred that substantially all pipe-aligning movements required of the pipe handling equipment are performed by means of apparatus mounted to the exterior of the pipe sections and that the ILUC is used to assist in aligning the pipes is subservient or secondary to the exterior equipment. By way of explanation, methods of aligning pipes of the prior art have relied on an ILUC to provide the aligning movements required. Such an ILUC may for example have had clamps arranged to expand in the radial direction. However the forces required to align pipes in a J-lay method when the pipes are arranged substantially vertically may make it difficult to use an ILUC as the sole means of aligning the pipe sections. Clamps of a pipe positioning system may be provided for moving the first and second pipe sections relative to each other. The ILUC may thus be independent of, and separate from, such clamps of the pipe positioning systems.

The measurement with which the alignment of the pipe is ascertained may comprise measuring the hi-lo on the outer profile of the joint. Hi-lo is an efficient and reliable measure of pipe alignment. Bevelled pipes have several reference points from which a hi-lo value can be ascertained (see FIG. 1). Externally measurable hi-lo values may include the "external cap hi-lo". It is preferred that the "external root hi-lo" is measured. It is preferred that the "external root hi-lo" is measured directly and that the internal hi-lo root is not measured directly. It may be that the "external cap hi-lo" need not be measured directly.

The measurement system may comprise a contact measurement system. It is preferred however that the step of taking measurements from which the degree of alignment of the pipe sections may be ascertained is performed by means of a non-contact measurement system. The measurement system may comprise an optical measurement system.

The optical system may comprise a laser measurement system. The laser systems may have a laser for emitting laser light toward the weld joint and a light sensor for receiving laser light reflected from the pipe sections in the vicinity of the weld joint. The laser may be arranged so that in use a laser beam emitted by the laser illuminates a particular point on the end of a pipe section. The light sensor may be arranged so that in use the light sensor receives laser light reflected from the pipe section. The light sensor may be a CCD based camera adapted for this application. The light sensor may have an output to a control unit; the control unit including a processor for carrying out processing of the electric signal received from the light sensor. The laser beam may be pulsed and scanned perpendicularly across the joint to be welded illuminating a series of light points. From a series of distance measurements ascertained by the control unit at these points, the control unit may be able to ascertain a profile of the depth of the weld joint. The control unit's processor may contain algorithms capable of extracting the external hi-lo measurements from the profile of the weld joint. The control unit's processor may contain algorithms capable of extracting gap measurements from the profile of the weld joint. Preferably this measurement system allows hi-lo, gap, and other geometrical information, to be detected to the nearest 0.2 mm. More preferably the measurement system allows hi-lo, gap, and other geometrical information, to be detected to the nearest 0.1 mm.

The optical system may comprise a camera. The camera may be arranged to capture an image of the joint to be welded in a tangential direction. The camera may be provided with a telecentric lens, the lens being configured such that the telecentric range includes the joint to be welded. An advantage of fitting a telecentric lens is that the lens may reduce geometric distortion, perspective effects and magnification effects in the cameras' image. This may allow hi-lo and gap values to be more easily interpreted from an image of the weld joint. The measurement system may comprise a light source, for example a backlight unit. The light source (or backlight unit) may be arranged to illuminate, for example tangentially (with reference to the geometry of the pipe), the joint to be welded. The light source (or backlight unit) may be arranged to emit collimated light. The bevelled section of the pipe can be highly reflective and not planar; the use of a collimated backlight may help avoid reflections from the inside of the pipes or the pipe faces. The light source (or backlight) may be configured to emit light at a wavelength that is different from the average wavelength or most intense wavelength of the ambient light. For example, the backlight unit may be arranged to emit light which is primarily red in colour. The camera may also include a corresponding filter with a pass band which corresponds to the wavelength of the backlight. This may help avoid interference from ambient light which may distort the final image. Such backlight configurations may, in comparison with laser-light detection systems such as those described above, reduce or mitigate the effect of dust or dirt, which may be present on the bevelled surface, which could introduce noise or distortion in an image of the weld joint. The camera may be so arranged that its field of view, when positioned for measuring hi-lo and/or the gap between the pipe end faces on a weld joint, captures light emitted from the light source (for example a backlight unit) and a silhouette of the joint to be welded. Preferably, the field of view of the camera captures an image of the pipes only in the region of the silhouette of the pipe end faces. A relatively simple monochromatic 2D image may therefore be acquired. Such an arrangement may be particularly well-suited for enabling subsequent image processing and/or machine vision analysis. Such an arrangement may be considered to be a high contrast photographic system. The step of taking measurements of the alignment of the pipe sections may include illuminating the joint to be welded and capturing with the camera an image (for example a silhouette image) of the external root hi-lo at each of a plurality of locations around the circumference of the weld joint.

The camera may output data to an image processing unit, which may form part of a control unit, for example in the form of a suitably programmed computer. The image processing unit may detect hi-lo and/or gap by means of an electronically-implemented pattern recognition method, for example using template matching. The template matching may be based on a priori information on the theoretical shape of the bevel. Such information may be stored as electronic data in a database. The image processing unit may detect hi-lo and/or gap by recognition of known shapes from the image, for example in dependence on the data in the database. The image processing unit may implement algorithms to identify points in the image between which the hi-lo and/or gap may be measured. Other algorithms may be implemented to extract the values of other geometrical parameters from the image. These may include for example one or more of the following: inner pipe radius, outer pipe radius, pipe wall thickness, bevel nose thickness, bevel angle, bevel curvature, and bevel depth.

Preferably the measurement system allows hi-lo, gap, and other geometrical information, to be detected to the nearest 0.2 mm. More preferably the measurement system allows hi-lo, gap, and other geometrical information, to be detected to the nearest 0.1 mm.

The camera is preferably in the form of an imaging camera. The camera may for example be capable of capturing an image, and permitting subsequent reproductions of such an image, with more than 100,000 pixels, preferably more than 200,000 pixels. The camera way comprise CCD elements. An imaging system having more than 100,000 pixels may be referred to herein as a "photographic measurement system". Photographic measurement systems may advantageously be capable of providing visual feedback to the pipe alignment operator. This feedback may be real-time. A photographic measurement system may further be used for inspecting other aspects of the weld join pre-weld and/or post-weld; for example smoothness of the weld cap.

A photographic measurement system is able to produce a 2D image of a weld joint; in comparison to a simple profile of a weld joint which may be produced by laser profiling the weld joint from above. Therefore, an advantage of a photographic system is that it may be able to provide more geometrical information than a laser system. Further, the capability of a laser system to detect a gap between the end faces of two pipes is related to the laser resolution and sampling frequency (for example, if the weld joint profile is sampled by a laser every 0.1 mm it is not possible to detect reliably a gap between pipe ends of the same order of size or smaller). A backlight photographic system may be able to detect a gap below 0.1 mm without the need for a high resolution camera.

Taking measurements, from which the degree of alignment of the pipe sections in the region of the joint may be ascertained, may include rotating the measurement systems about the axis of the pipe sections. The measurement system may be rotated on a rail or band, for example mounted to one or other (or both) of the pipe sections. The measurement system may be rotated on a rail or band not directly mounted to the pipe sections. The measurement system may be configured to traverse the band or rail. The measurement system may be rotated on a support mounted to a J-lay tower and/or pipeline laying vessel. The measurement system may take a plurality of measurements at predefined angular positions around the pipe. The measurement system may automatically traverse the circumference of the pipe. The measurement system may automatically take measurements whilst automatically traversing the circumference of the pipe. There may be 40 or more measurements taken to adequately characterize how the hi-lo varies around the circumference. More than 100 measurements may be taken. In certain embodiments of the invention, all (or substantially all) of the operational measurements taken in order to ascertain the hi-lo, or optionally hi-lo and gap, are made in the J-lay tower. Such embodiments are therefore relative simple and easy to implement. In an embodiment described below, the taking of all of the operational measurements in order to ascertain the hi-lo in the J-lay tower utilizes a relatively low intensive computer processing means.

As mentioned above, taking hi-lo measurements around the circumference of the joint from the exterior may provide sufficient information to ascertain the relative movement of the pipe sections that is required to improve their alignment in view of a desired criteria concerning the internal hi-lo. The measured external hi-lo may be combined with known geometric information about the pipes' bevels for example to make inferences about the internal hi-lo (as explained in further detail elsewhere). The combination of this information may for example allow the internal hi-lo to be calculated (or inferred) to within a specific error margin (or uncertainty). Such geometric information (which may consist of an indication of the margin of error/tolerance between an external hi-lo and the internal hi-lo) about the pipes' bevels may be stored in a memory storage device. There may be a step in the method of characterizing, and storing associated data in the memory of a control unit, the geometry of the bevelled ends of the pipe-sections.

Taking a plurality of measurements around the circumference of the joint may also provide sufficient information to ascertain geometric information about the pipe end. The geometric information may include Out of Roundness (OOR) of the pipe sections. The geometric information may include weld joint depth. This may give an indication of the wear of the bevelling tool used to bevel the pipe ends.

Automating the measuring of the hi-lo and/or gap, and/or the rotating of the hi-lo measurement system is preferred and may provide efficiency improvements for the overall pipe alignment process.

Ascertaining, on the basis of the measurements, the movement required of one of the pipe sections relative to the other in order to improve the alignment of the pipe sections may include ascertaining the direction of movement required. Ascertaining, on the basis of the measurements, the movement required of one of the pipe sections relative to the other in order to improve their alignment may include ascertaining the distance of movement required. The actuators for effecting relative movement may be arranged to move a pipe section by multiples of steps. Each step may be less than 0.5 mm. Each step may be more than 0.05 mm. The actuator may be required to move a distance of more than two steps in any given single movement.

Ascertaining, on the basis of the measurements, the movement required of one of the pipe sections relative to the other in order to improve their alignment may include inputting the measurements into a control unit. The ascertaining step may include the control unit calculating a relative movement to reduce one or more measures of hi-lo to below a predetermined threshold. The ascertaining step may include the control unit calculating a relative movement to reduce one or more measures of gap below a predetermined threshold. The predetermined threshold may be a maximum and/or average value of hi-lo at the root of the joint to be welded. The predetermined threshold may be a maximum hi-lo on the internal surfaces of the pipe sections. The maximum hi-lo on the internal surfaces of the pipe sections may be inferred from measurements of the hi-lo on the root of the joint to be welded and information concerning the manufacturing tolerances relating to the geometry of the beveled of the pipe sections. The predetermined threshold may be a maximum and/or average value of gap at the root of the joint to be welded.

Effecting the relative movement so ascertained may include moving the second pipe section in the plane of the bevels. Effecting the relative movement so ascertained may include rotating the second pipe section about an axis parallel to the pipe. Effecting the relative movement so ascertained may include moving the second pipe section away from the first pipe section, moving the second pipe section in the plane of its bevel, rotating the second pipe section about an axis parallel to the pipe, rotating the second pipe section about an axis perpendicular to the pipe, and moving the second pipe section towards the first pipe section to define therebetween a joint to be welded. The relative movement so ascertained may be effected by operation of the pipe handling apparatus detailed above.

The present invention also provides a method of welding two pipes together at sea when laying a pipeline to the sea-bed, wherein the method comprises:

holding one end of the pipeline within a J-lay tower on a pipe-laying vessel, the pipeline having a free end which is bevelled ready for welding, providing a pipe section having a free end which is bevelled ready for welding, effecting movement of the pipe section relative to the pipeline so as to bring the pipe section and the pipeline into contact in a position ready for welding the two free ends together, then making measurements from the exterior of the pipeline and pipe section of the hi-lo step defined between the free ends of the pipe section and the pipeline when so positioned ready for welding, and ascertaining whether the hi-lo measurements between the pipe section and the pipeline meet one or more predefined criteria for acceptable alignment.

The method may additionally include steps of:

making measurements from the exterior of the pipeline and pipe section of the gap defined between the free ends of the pipe section and the pipeline when so positioned ready for welding, and ascertaining whether the gap measurements between the pipe section and the pipeline meet one or more predefined criteria for acceptable alignment.

The method may then include a step, if the hi-lo, or hi-lo and gap, measurements between the pipe section and the pipeline meet the one or more predefined criteria for acceptable alignment, of proceeding to effect the welding of the pipes together, preferably without further moving the pipes relative to the J-lay tower. If, on the other hand, the hi-lo, or hi-lo and gap, measurements between the pipe section and the pipeline fail to meet the one or more predefined criteria for acceptable alignment, then the method may include a step of effecting corrective movement of the pipe section relative to the pipeline towards the target orientation.

The geometry of the pipe sections' ends (the bevels for example) may be acquired. The geometric data may include the width of the bevel nose (i.e. the width as measured in the radial direction) at a given angular position on the bevel. The geometric data may include the inner and/or outer diameter of the pipe at a given angular position on the end face/bevel. The acquisition of the pipe end geometry may take place outside the J-lay tower. The acquisition of the pipe end geometry may take place outside any of the pipe-lowering and pipe-welding infrastructures. The acquisition of the pipe end geometry may take place not on-board a pipeline laying vessel. It is preferred however (for example when the method is a method of J-laying pipeline) that both the bevelling and the acquisition of the pipe end geometry are performed on board the pipe laying vessel, and preferably at the same pipe processing station. The acquisition of the pipe end geometry may be effected using an optical measurement system. The acquisition of the pipe end geometry may be done using a laser measurement systems or photographic system. A reference point or reference marker, which relates to the acquired geometric data, may be present on the pipeline. In the case of a pipe with a weld seam this reference marker may be the weld seam. A reference marker may alternatively be painted, attached or etched onto the pipe sections. The geometric data may be used to position the pipe sections at a preferable orientation.

As mentioned already a control unit may be provided to provide one or more control and/or data processing functions. The geometric data previously acquired concerning the geometry of the pipe sections' end faces (e.g. bevels) may be input into the control unit, for example held in a memory storage device accessible by or forming part of the control unit. The control unit may process the geometric data of first pipe section's bevel and the second pipe section's bevel to be joined. The control unit may calculate a target position and orientation of the pipe sections for welding, for example in dependence on the geometry of the pipe sections' end faces (or bevels). The target position may be calculated to provide a desirable distribution of hi-lo across the weld joint. It may be possible to optimise the alignment of pipes in this way, so as to not only ensure that the hi-lo criteria are met but that the best alignment possible is set as the target. Weld quality may also be increased.

The control unit may determine whether or not the pipe end geometry of a pipe section is sufficiently closely matched to the pipe end geometry of the end of the first pipe section to be suitable for use as the second pipe section. The control unit way provide an output, which may for example alert the operator, in the event that two pipe sections are incompatible. The control unit may provide such an output, alerting the operator, in the event that two pipe sections are incompatible before the second pipe section is loaded into a J-lay tower. This measure may save time by reducing the number of rejected welds.

Preferably the compatibility of a pipe section with the end of the pipeline is assessed before the pipe section is loaded into the J-lay tower, more preferably before the pipe section is moved to the bridge of a pipeline laying vessel, so as to reduce time lost by handling incompatible pipe sections.

During the initial pipe positioning, the pipe sections may beneficially be aligned close to the desired (prior calculated) target orientation, for example with the use of the previously acquired geometry of the pipe sections' ends' bevels and/or the previously calculated target position and orientation of the pipe sections for welding. This may reduce the time associated with the repositioning step and may thus increase productivity.

A plurality of pipe sections may be successively welded to form or lengthen a pipeline. The geometry of each pipe section's end (particularly for example the bevel) may be ascertained. The geometric data may be processed to ascertain a beneficial order in which to weld the pipe sections. This may lead to simpler line-up operations, lower residual hi-lo and/or gaps before welding, reduced pipe handling, and may ensure no pipe section need be moved out of the J-lay tower due to incompatibility with the end of the pipeline. This may also improve the overall quality of the welds across the pipeline.

The out of roundness (OOR) of pipe section may be measured, optionally before a pipe section is bevelled. OOR may fundamentally affect the compatibility of two pipe sections as OOR cannot be corrected by bevelling. The geometry (including OOR) of a plurality of pipe sections be successively measured (before or after bevelling) and the measurements processed to ascertain an optimal sequence for the pipes to be coupled. The sequence may ensure that each pipe section could, in theory, be welded in an acceptable manner to adjacent pipe sections. The sequence may preferably seek to ascertain an order which will provide the overlap between adjacent pipe end faces. The OOR and/or other geometric measurements may be taken on-shore. The pipe sections may then be stored in the hold of a pipeline laying vessel according to a sequence so ascertained. This may lead to reduced time spent handling incompatible pipes on-board a pipe handling vessel.

When the geometry of the pipes' ends (e.g. bevels) are adequately characterized and known, the step of taking measurements, from which the degree of alignment of the pipe sections in the region of the joint may be ascertained, may comprise measuring the hi-lo in a small number of discrete locations, with a minimum of two locations. In some embodiments, these hi-lo measurements may be combined with the knowledge of the geometry of the pipes' ends to provide all the information required to perform the alignment of the pipes and/or calculate the hi-lo at a given location, or locations, around the pipes. In such a case, the hi-lo may be measured in only two or three locations and yet provide sufficient information. The relative rotational position (about the pipe axis) of one pipe-section relative to the other may also need to be ascertained or taken into account. In some embodiments, for example where the axes of the pipe sections are not aligned, measurements may additionally need to be taken of any gap or gaps between the end faces of the pipe sections in order to fully ascertain the relative positions of the pipe end faces at the weld joint. When the geometry of the pipes' ends (e.g. bevels) are adequately characterized and known, it is preferred that the hi-lo, or hi-lo and gap, is measured in ten or fewer locations. The hi-lo, or hi-lo and gap, could in such circumstances be measured (or subsequently determined) with the use of a laser sensor or photographic system. It may be that the bevel geometry of each pipe section has already been fully characterized.

Knowledge of (a) the relative rotational position of one pipe-section relative to the other (which can be ascertained with reference to the seam when using seamed pipes, or with reference to some other reference mark on the pipe surface), (b) the hi-lo at at least two discrete locations and (c) the information previously acquired concerning the geometry of the pipe sections' ends (e.g. of the bevels); is, in some embodiments, sufficient to determine completely the relative orientation of the pipe sections and, preferably, also the hi-lo at any point between the locations at which the hi-lo has actually been measured. In addition to knowledge of the above, knowledge of (d) the gap between the end faces of the pipe sections at at least two discrete locations, is, in some embodiments, sufficient to determine the gap at any point between the locations at which the gap has actually been measured. The relative rotational position of one pipe-section relative to the other may need only be known to within an accuracy of less than +/−5 degrees. It will be known that it is preferred in certain pipe-laying operations for successive pipe sections to be welded such that their seams are rotationally off-set relative to each other.

The method may include using the bevels' geometric data to calculate the hi-lo, or optionally hi-lo and gap, between the points at which the measurements were taken. That may assist in ascertaining the movement required of one of the pipe sections relative to the other, in order to improve their alignment.

Reducing the number of hi-lo measurements needed, when the pipe sections are positioned in their end-to-end configuration defining the joint to be welded, to ascertain the hi-lo over the entire circumference of the joint to be welded may reduce the time associated with taking measurements when the pipe sections are positioned in their end-to-end configuration, potentially enabling faster alignment of the pipes and improved production rates.

The method may include using the measurement data (i.e. the data acquired during the step of taking the measurements by means of the measurement system outside the pipe sections), and the bevels' geometric data, to calculate the positions of the pipe sections relative to their target alignment.

The present invention provides a method of welding two pipes together at sea when laying a pipeline to the sea-bed, wherein the method comprises:

holding one end of the pipeline within a J-lay tower on a pipe-laying vessel, the pipeline having a free end which is bevelled ready for welding, the geometry of the bevelled free end of the pipeline being characterized and stored in the memory of a control system, providing a pipe section having a free end which is bevelled ready for welding, making measurements of the bevelled free end of the pipe section outside the J-lay tower, characterizing and storing in the memory of a control system the geometry of the bevelled free end of the pipe section with the use of such measurements, the control unit calculating, using the stored characterizations of the geometry of the bevelled free ends of the pipeline and pipe section, a target orientation that lines up the free ends of the bevelled free ends of the pipeline and the pipe section, and effecting movement of the pipe section relative to the pipeline in dependence on the target orientation so calculated and bringing the pipe section and the pipeline into contact in a position ready for welding the two free ends together.

In embodiments of the present invention it may thus be possible to calculate the matching alignment/orientation of the pipe section relative to the pipeline in an efficient and accurate manner whilst reducing the amount of measurements required within the J-lay tower. The step of ascertaining the relative movement of the pipe sections may include ascertaining the relative movement of the pipe sections in order to achieve the target orientation. The step of effecting the relative movement, so ascertained to improve the alignment of the pipe sections, may include moving the pipe sections towards their target alignment.

The method may include a step of verifying the achieved alignment by ascertaining the degree of alignment of the pipe sections, for example after the step of effecting the relative movement to improve the alignment of the pipe sections. There may then be a subsequent step, for example if the achieved alignment is deemed not acceptable, of further repositioning the pipe sections. Once the alignment of the pipes has been finally verified, it is preferred that the pipe sections are not moved again relative to each other so that the step of welding can be effected before the pipes are moved again. It is also preferred, once the alignment of the pipes has been finally verified, that the second pipe section is not moved relative to the J-lay tower until after the welding step has been completed.

The method may include a step of recording data representative of the hi-lo and/or gap measurements and/or characteristics of each joint welded in a memory storage device, for example one being accessible by or forming part of a control unit used in performance of the method. The recorded data may be used for reporting on the quality of the weld (e.g. in a welding quality report).

The method of the present invention may have application in relation to various pipe-laying applications requiring accurate alignment of the pipe sections. Some applications (for example high quality operations when laying "SCRs", steel catenary risers) may require the hi-lo to be 0.5 mm.

Other less demanding SCR applications may require the hi-lo to be <1 mm. Standard trunk line may permit the hi-lo to be up to 3 mm.

The pipe-sections used in the method will typically be ones suitable for transportation of hydrocarbons, such as gas or oil, and will of course be suitable for use at sea. Such pipes may have a diameter in the range of 3 to 60 inches, and will often be larger than 10 inches in diameter. The pipe sections may have a diameter in the range of 6 to 40 inches. The present invention has particular application in relation to pipes with a diameter of 200 mm or greater, preferably 500 mm or greater. The pipe wall thickness will typically be greater than 10 mm. The pipe sections may have pipe wall thickness in the range of 5 mm to 50 mm. The present invention has particular application in relation to pipes having a pipe wall thickness of 20 mm or greater.

The pipes may be carbon steel pipes. The pipes may be clad pipes (i.e. having an internal lining of a different material, such as a corrosion resistant alloy).

According to a second aspect of the invention there is provided a pipe handling apparatus for aligning the end of a first pipe section to the end of a second pipe section in an end-to-end configuration. The pipe handling apparatus may be arranged and configured to perform the initial positioning, the alignment-measuring and alignment-improving steps of the method of the present invention. The pipe handling apparatus is arranged and configured to initially position the pipe sections so that the end of the first pipe section abuts the end of the second pipe section to define therebetween a joint to be welded. The pipe handling apparatus comprises a pipe positioning system. The pipe handling apparatus comprises a hi-lo measurement system. The pipe positioning system way comprise a movable support device, for example comprising clamps configured to hold and manipulate the position of the first pipe section relative to the second pipe section. The hi-lo measurement system preferably comprises a sensing device configured to measure the hi-lo on the outer profile of the joint to be welded.

The pipe handling apparatus may be arranged, for example by means of additionally comprising a gap measurement system, for measuring any gap or gaps between the pipe end faces of the first pipe section and the second pipe section. The hi-lo measurement system may be suitable for measuring the gap and may additionally be used or adapted for this purpose.

The pipe handling apparatus according to the second aspect provides an apparatus wherein, in use, the alignment of the pipe sections may be ascertained in the final position ready for, but before commencing, welding. Therefore the conditions in which the alignment is ascertained may be very close to the conditions in which the pipes are welded.

The pipe positioning system may include a fixed clamp for holding one pipe section in place by clamping or otherwise supporting the exterior of the pipe section. The fixed clamp may hold the end of a subsea pipeline.

The pipe handling apparatus may include an Internal Line Up Clamp (ILUC), for example as featured in WO201046390. The ILUC may be configured for inserting into the pipe sections.

The pipe positioning system may have a control unit for controlling or otherwise facilitating the aligning of the pipe sections. The control unit may allow the position of the pipe section to be controlled manually by an operator, for example with a joystick. The pipe positioning system may have a camera and screen to provide visual feedback to the operator. The pipe positioning system may have sensors and a screen to provide visual feedback to the operator. The pipe positioning system may be controlled by a control unit. The control unit may be capable of actuating actuators on the pipe positioning system to automatically alter the position of the pipe section in response to input from the operator. For example the operator may input target coordinates for the location of the pipe section. The control unit may be capable of automatically altering the position of the pipe section in response to input from sensors and/or other control modules in the pipe handling apparatus.

The pipe positioning system may be arranged to effect the relative movement of the pipes by moving the second pipe section in the plane of its bevel (in the x, y plane). The pipe positioning system may be arranged to effect moving of the second pipe section in a direction parallel to its axis (along the z axis). The pipe positioning system may be arranged to effect rotating of the second pipe section about its axis (about the z axis). The pipe positioning system may be arranged to effect rotation of the second pipe section about one axis, or two orthogonal axes, perpendicular to the pipe's axis (about the x and y axes). The pipe positioning system may be arranged and configured for use in the method of the present invention (for example, as part of the step of effecting the relative movement to improve the alignment of the pipe sections), according to any of the aspect described or claimed herein.

The hi-lo measurement system may include a camera. The hi-lo measurement system may comprise a backlight unit. The backlight unit may include a collimated light source. The hi-lo measurement system may include an image processing unit, for example a computer and/or forming part of a control unit. The image processing unit may be configured to receive input from the camera. The image processing unit may be configured to process the image data to determine the hi-lo at the location around the circumference of the weld joint at which the image was taken. The hi-lo measurement system may be configured to be rotated about the axis of the pipe sections. The hi-lo measurement system may be arranged and configured for use in the method of the present invention, according to any of the aspect described or claimed herein.

A measurement system for making measurements of any gap or gaps between the two pipe end faces may be arranged similarly to, or be incorporated within, the hi-lo measurement system. The gap measurement system may be arranged and configured for use in the method of the present invention, according to any of the aspects described or claimed herein.

The pipe handling apparatus may include a control unit, for example for ascertaining the movement required of one of the pipe sections relative to the other in order to improve their alignment. The control unit may be configured to receive input from the hi-lo, or hi-lo and gap, measurement system. The control unit may be configured to compare the hi-lo, or optionally hi-lo and gap, data to reference data in order to determine whether the pipes are sufficiently well aligned for welding. The reference data may include: a maximum hi-lo, a maximum average hi-lo, correlation to a distribution of hi-lo around the weld joint, maximum gap, maximum average gap, and/or correlation to a distribution at gaps around the weld joint. The control unit may be configured to calculate a target alignment of the pipe sections. The control unit may be configured to calculate the relative movement of the pipe sections required in order to improve the alignment of the pipe sections as compared to a target orientation and/or to calculate instructions (control signals) for the actuation of the pipe positioning system to achieve the target alignment.

The pipe handling apparatus may include a pipe-end measuring apparatus. The pipe-end measuring apparatus may be configured to acquire the geometry of an end face of the first pipe section and/or the second pipe section (and preferably, the bevel geometry). The geometric measurements made by the pipe-end measuring apparatus, at a given position on the bevel, may include one or more of the following: inner pipe radius, outer pipe radius, pipe wall thickness, bevel nose thickness, bevel angle, bevel curvature, pipe face flatness, and out of roundness. The pipe-end measuring system may include a storage means by which the geometric data can be stored or output. The pipe-end measuring apparatus may comprise a laser measurement system. The pipe-end measuring apparatus may comprise a photographic measurement system. A camera may image the end face of the pipe section. Geometric parameters may then be extracted from the image by a control unit. A photographic system may lead to speed improvements as the relevant geometries may be ascertained with a single image rather than a full scan of the bevel with a laser. The pipe-end measuring apparatus may be situated independently of the pipe positioning system, hi-lo measuring system and gap measuring system. The pipe-end measuring apparatus or a part thereof, may be configured to measure the geometry of a pipe section before and/or after it is bevelled. The control unit may be configured to store and process a plurality of pipe section geometries and to ascertain an optimal sequence for the pipe sections to be coupled to form a pipeline. The control unit may suggest a sequence with which the pipe sections could be stored in a hold in a pipeline laying vessel which would reduce handling of the pipe sections during pipeline laying operations.

The pipe positioning system may be provided as part of a J-lay tower. The boundary of the pipe positioning system may be defined by the J-lay tower.

According to a third aspect of the invention there is also provided a pipe-laying vessel. The pipe-laying vessel may be configured to perform the method of the present invention, according to any of the aspect described or claimed herein. The pipe-laying vessel may comprise a pipe handling apparatus of the present invention, according to any of the aspect described or claimed herein. The pipe-laying vessel may for example comprise a pipe positioning system, a hi-lo measurement system and, optionally, a gap measurement system. The hi-lo measurement system may be positioned within the boundary of the pipe positioning system. The gap measurement system may be positioned within the boundary of the pipe positioning system. The vessel may include a J-lay tower. The vessel may be a J-lay vessel.

The pipe-laying vessel may include a pipe-end measuring apparatus configured to acquire the geometry of an end face of the first pipe section end/or the second pipe section. The pipe-end measuring apparatus may be positioned outside of the boundary of the pipe positioning system. The pipe-end measuring apparatus may be positioned outside of the boundary of the J-lay tower. The pipe-end measuring apparatus may be provided as part of a bevelling station. The vessel may include a control unit. Such a control unit may be arranged to receive data from the pipe-end measuring apparatus concerning the geometry of the end face of the pipe sections. The control unit may additionally, at alternatively, receive data from the hi-lo measurement system. The control unit may additionally receive data from the gap measurement system. The control unit may be arranged, preferably with the use of data from the pipe-end measuring apparatus and/or the hi-lo measurement system, and preferably also the gap measurement system, to control the alignment of the first and second pipe sections relative to each other.

According to a fourth aspect of the invention there is provided a control unit for use in the method or apparatus of the present invention, according to any of the aspect described or claimed herein. The control unit may be configured to control the alignment of first and second pipe sections in a method or apparatus for J-laying of pipeline at sea. The control unit may be arranged to receive data concerning the external root hi-lo as taken by the measurement system during performance of the method of the invention or as taken by a hi-lo measurement system of the invention, according to any of the aspect described or claimed herein. The control unit may also be arranged to receive data concerning any gap or gaps between the end faces of the first and second pipe sections as taken by a measurement system during performance of the method of the invention or as taken by a gap measurement system of the invention, according to any of the aspect described or claimed herein. The control unit may be arranged to perform a step of ascertaining the relative movement required of one of the pipe sections to improve their alignment, according to any of the aspect of the invention described or claimed herein. The control unit may be arranged to effect or control the relative movement. The control unit may be arranged to control the pipe positioning system according to any of the aspect described or claimed herein.

The present invention may also provide a computer software product arranged, when executes on a computer that is or defines part of a control unit, causes that control unit to be arranged for use as the control unit according to any of the aspect of the method or apparatus of the invention as described or claimed herein.

It will of course be appreciated that features described in relation to one aspect of the present invention be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 3c shows an example of a weld joint profile, so ascertained by the system of the first embodiment of the invention;

DETAILED DESCRIPTION

Figure 2:
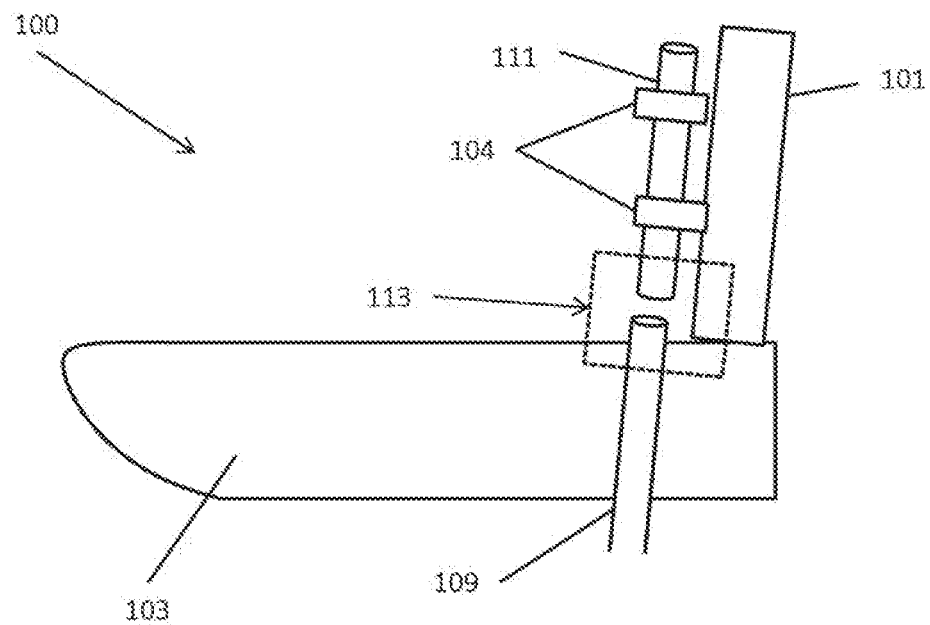
FIG. 2 shows a side view of a pipeline laying vessel and pipe handling apparatus according to a first embodiment of the invention.

FIG. 2 shows a pipe handling apparatus 100 according to a first embodiment of the present invention. There is shown a pipeline laying vessel 103 having a J-lay tower 101 which supports a pipe positioning system 104. The pipeline laying vessel 103 is at sea and is configured for J-lay pipeline laying operations. A carbon steel pipeline 109 extends from the sea bed to the pipeline laying vessel 103. At the pipeline laying vessel 103, the end of the pipeline 103 protrudes into the vessel 103 at a substantially vertical orientation; the end of the pipeline 109 being held by a large clamp (not shown), which in this case is in the form of a fixed Hang Off Clamp.

The J-lay tower 101 is mounted to the deck of the pipeline laying vessel 103 and is configured to support a pipe section 111, in a substantially vertical position above the end of the pipeline 109, for joining end-to-end with the end of the pipeline 109. The end faces of the pipes are bevelled to a particular pre-defined bevel shape with a high degree of accuracy (tolerances of +/−0.1 mm typically being achievable). The pipes are bevelled so that the side walls of the bevelled pipe ends, when viewed in cross-section, extend from the root at on angle of about 10 degrees to each other (in other embodiments this might be between 0 and 15 degrees). The pipe walls are about 18 mm thick and the pipes have an outer diameter of about 330 mm. An elevator (not shown) is configured to move pipe sections to the top of the J-lay tower 101.

The pipe suction 111 is held by a pipe positioning system 104 comprising a clamp assembly controllable via a corresponding actuator assembly which is mounted to the J-lay tower 101. The set of actuators of the actuator assembly comprises: actuators for rotating the pipe section 111 about its axis, actuators for moving the pipe section 111 in a substantially horizontal plane (as defined by the pipe section's end face), actuators for altering the angle of the axis of the upper pipe section 111 with respect to the axis of the lower pipe section 109 at the end of the pipeline, and actuators for moving the pipe section 111 in the vertical plane (along its axis). The actuators are thus configured to enable the alignment of the pipe section 111 with the pipeline below 109.

A measurement system 113 is located in the region in which the pipe section 111 and the end of the pipeline 109 meet in an end-to-end configuration.

Figure 3A:
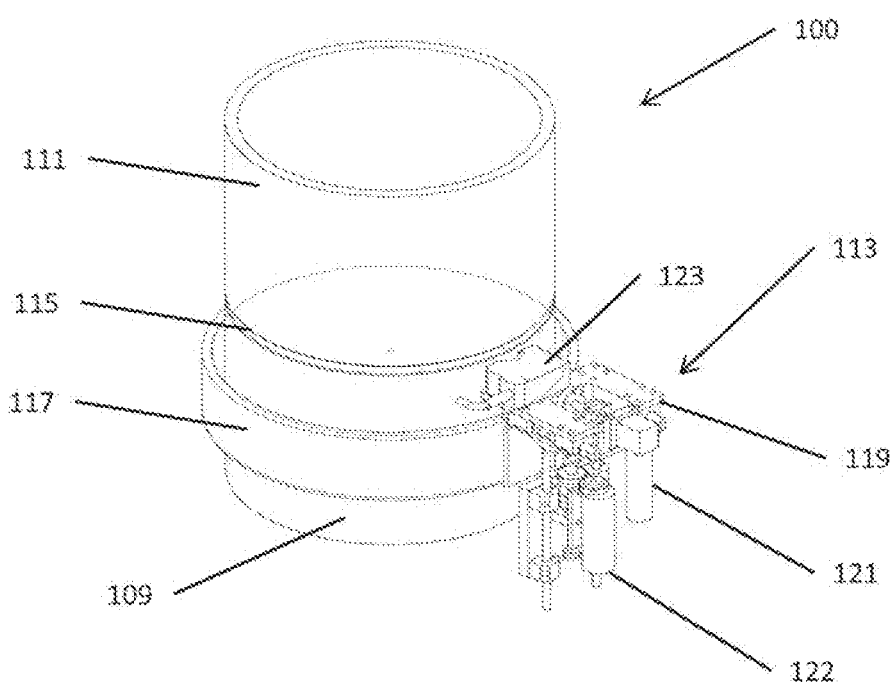
FIG. 3a shows a perspective view of a hi-lo measurement system of the first embodiment of the invention.
Figure 3B:
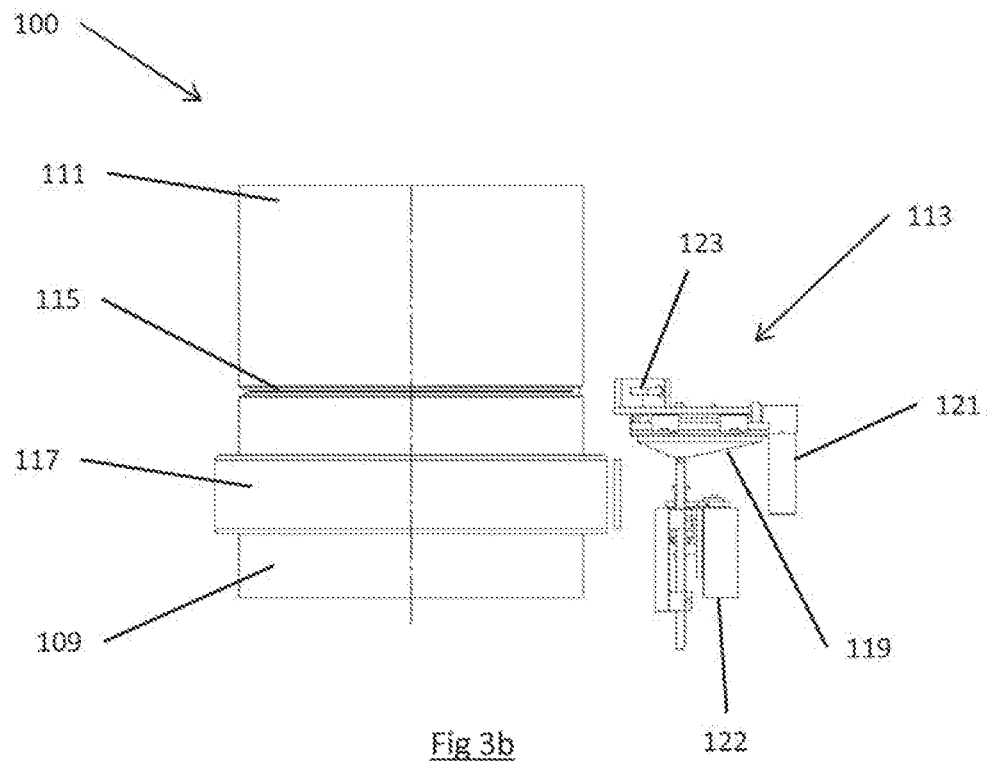
FIG. 3b shows a side view of the hi-lo measurement system of the first embodiment of the invention.
Figure 3C:
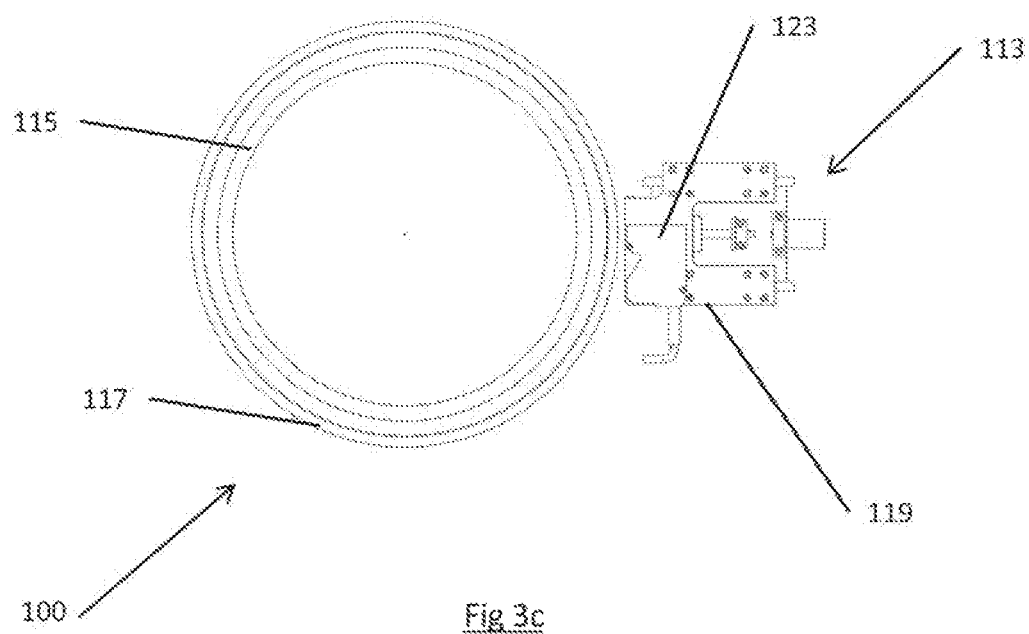
FIG. 3c shows a plan view of the hi-lo measurement system of the first embodiment of the invention.

FIGS. 3a, 3b and 3c show the measurement system 113 used in the according to a first embodiment 100 of the pipeline handling apparatus. FIGS. 3a, 3b and 3c show the end of the pipeline 109 and the pipe section 111 arranged in an end-to-end configuration, the end of the pipe section 111 abutting the end of the pipeline 109, to define therebetween a joint to be welded 115. A weld band 117, is mounted around the circumference of the pipeline 109 in close proximity to the weld joint. A carriage 119, which carries hi-lo and gap measuring apparatus, is moveably mounted onto the weld band 117. The carriage 119 is configured such that it can traverse the whole perimeter of the weld band 117. The carriage 119 is driven by a motor (not shown) which receives input from a control unit, in a form of a computer, (not shown) that controls the movement of the carriage 119 around the weld band 117. A motor 121 controls the radial movement and positioning of the measuring apparatus, and so controls the radial distance of the measuring apparatus from the weld joint. A motor 122 controls the axial movement and positioning of the measuring apparatus, and so controls axial alignment of the measuring apparatus with the weld joint.

Figure 3D:
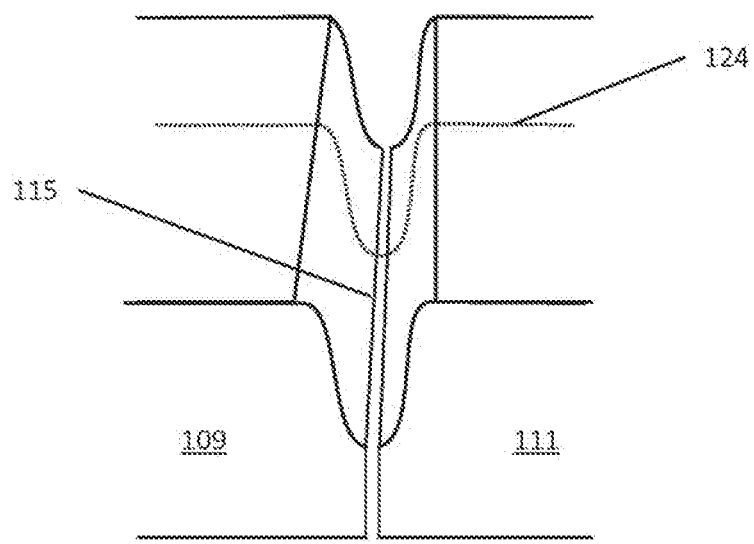
FIG. 3d shows a perspective view of a joint to be welded measurement points across, according to a first embodiment of the invention.

A laser head 123, containing a laser source and light sensor, is mounted on the carriage 119. In use, the laser emits a laser beam towards abutting pipe sections 109, 111 at the joint 115 to be welded. The laser beam illuminates a series of points along a notional line 124 which extends perpendicularity across the weld joint 115, as shown in FIG. 3d, which shows a close up view of the joint 115 to be welded. The light sensor receives the reflected laser light from these points.

Figure 1A:
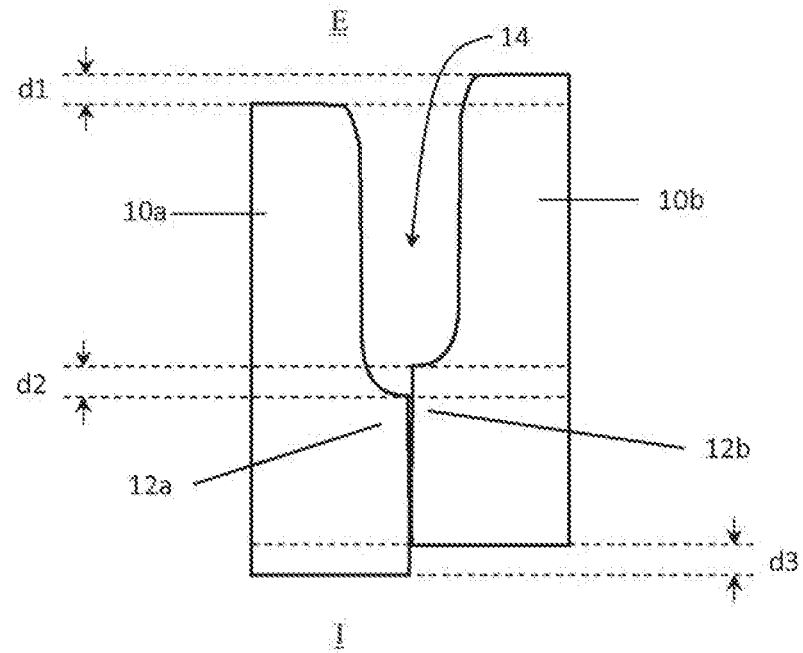
FIG. 1a shows a partial cross section view of two pipes arranged end-to-end showing measurable hi-lo distances.
Figure 1B:
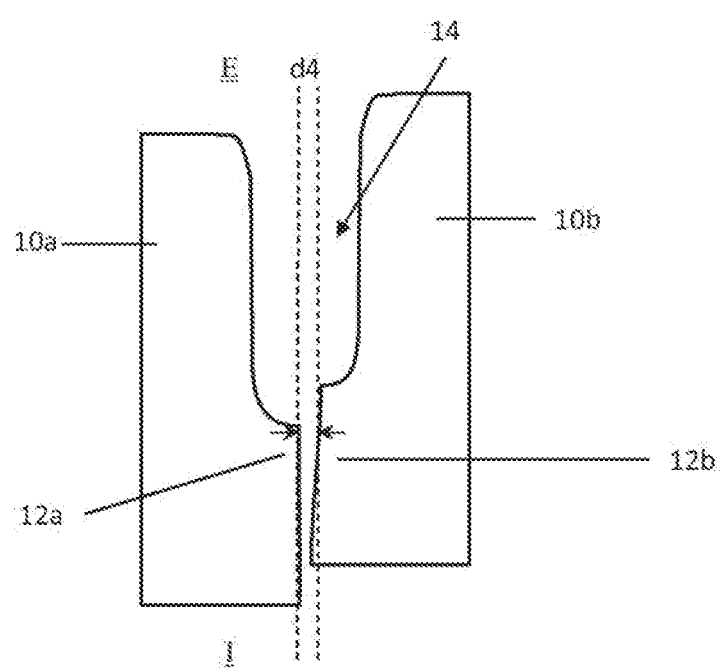
FIG. 1b shows a partial cross section view of two pipes arranged end-to-end showing measurable gap distances.
Figure 3E:
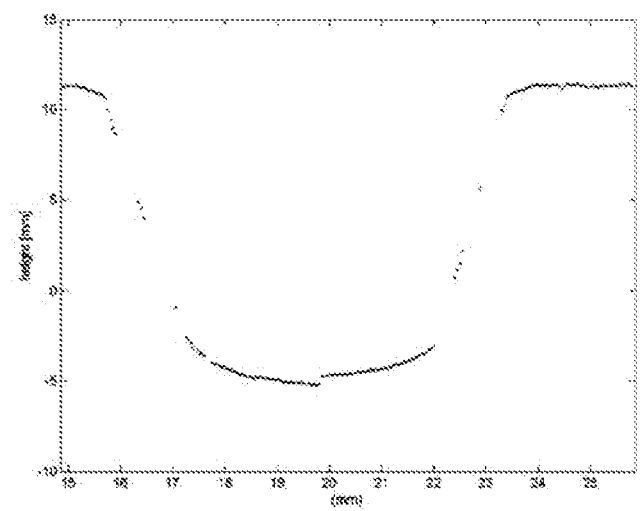

The light sensor has an output to the control unit; the control unit includes a processor for carrying out processing of the light signal received by the light sensor. From, for example the angle of, the reflected light received from a given light point, the control unit can calculate the distance between the detector and the surface from which the laser light is reflected. Hence, as the laser scans perpendicularly across the joint to be welded 115 the control unit ascertains a series of distance measurements. By interpolating between the measurement points, the control unit ascertains the relief (i.e. the profile) of the weld joint 115. FIG. 3e shows an example of a profile so ascertained by the laser measurement system. The control unit's processor is programmed with software (containing algorithms) capable of extracting the external hi-lo (d2, as shown in FIG. 1a), and gap measurements (d4 as shown in FIG. 1b) from the profile of the weld joint 115.

In this embodiment, the algorithms used by the control unit for profile extraction also cater for reflections and irregularities due to dirt on the bevelled surface. Further, in this embodiment, the algorithms used and the control unit are configured so that they are capable of providing high enough resolution to measure external root hi-lo (d2) to an uncertainty of 0.1 mm.

Whilst, only the external root hi-lo (d2) is directly measured, the bevel nose shape is known to have a shape within tolerances of the order of +/−0.1 mm and therefore the measurement of the external root hi-lo can be equated to a measurement of the internal hi-lo (d3) once an error factor, equal to the tolerance in bevel shape, is factored in. Thus, with the present embodiment, the more important hi-lo measurement to ascertain, the internal hi-lo (d3), can be inferred (from the measurements taken of the external hi-lo and knowledge of bevelling tolerances) with an accuracy of +/−0.2 mm.

In use, the measurement system 113 is rotated around the weld joint 115 and measures the hi-lo and gap at a plurality of pre-defined positions around the weld joint 115 as it rotates.

If the hi-lo/gap measurements are within the pre-set criteria for correct alignment of pipes then the pipes are welded together. If the criteria are not met, then the control unit uses the hi-lo and gap data to ascertain a target alignment for the pipe sections 109, 111. The control unit outputs control signals to the pipe positioning system 104 for moving the pipe section 111 to achieve the target alignment.

Figure 4A:
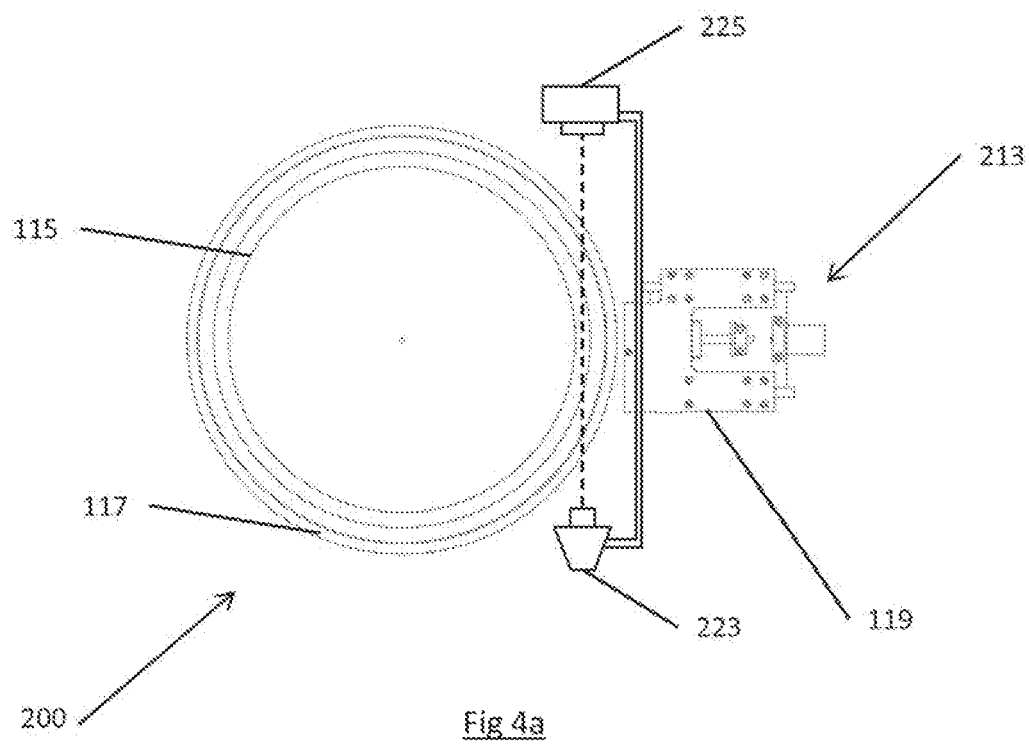
FIG. 4a shows a schematic plan view of a hi-lo measurement system according to a second embodiment of the invention.

In a second embodiment of the invention 200, the laser based hi-lo measurement system 113 referenced in the first embodiment is replaced by a camera 223 and backlight 225 based measurement system 213, as shown in FIG. 4*a*. A camera 223 and a backlight 225 are mounted on the carriage 119. In use, the backlight 225 is configured to cast rays of collimated red light tangentially to the circumference of the pipes and the joint 115 to be welded. The camera 223 is configured to face the backlight, having a corresponding tangential field of view along the weld joint 115. The camera 223 is additionally configured to detect only light rays substantially parallel to the weld joint 115 by means of a telecentric lens fitted to the camera 223; this reduces distortion, parallax error, and other effects of reflected light. The camera 223 is fitted with a filter which has a pass band corresponding to the wavelength of light emitted by the backlight, so to avoid noise from any ambient light. Hence the backlight 225 illuminates the weld joint 115 and the camera 223 detects an image of the silhouette of the weld joint 115. The dashed line in FIG. 4*a* depicts the path of a light ray travelling from the backlight 225 to the camera 223. The external hi-lo d2 (and d1), as shown in FIG. 1*a*, between the pipe section 111 and pipeline 109 is thus visible in the camera's image.

Figure 4B:
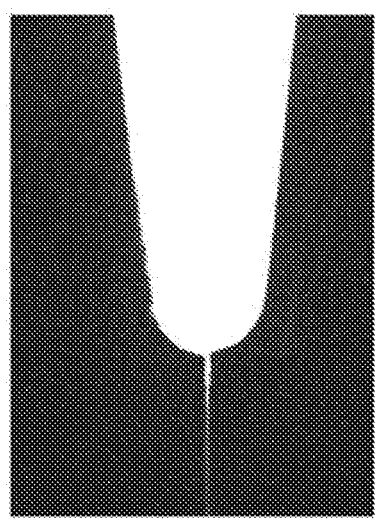
FIG. 4b shows an example of a silhouette image of a weld joint, so ascertained by the system of the second embodiment of the invention.

The camera 223 has an output to the control unit, the control unit includes an image processor for carrying out the image processing. The image processor is capable of obtaining a hi-lo measurement (of the external root hi-lo "d2") from the image of the weld joint. The image processor is also able to obtain a measurement of any gap between the pipe section's 109, 111 end faces ("d4"). The image processor determines hi-lo and gap by recognition of known shapes or geometrical parameters from the silhouette image. FIG. 4*b* shows an example of a silhouette image so ascertained by the measurement system 213. Data on known shapes is stored as electronic data in a database in the control unit. The measurement system 213 and image processor are configured such that they are capable of measuring the external root hi-lo to an uncertainty of the order of 0.1 mm. In a manner similar to the first embodiment, the control unit uses the hi-lo data to ascertain whether the pipes are correctly aligned and, if not, to ascertain a target alignment for the pipe sections 109, 111.

Figure 5:
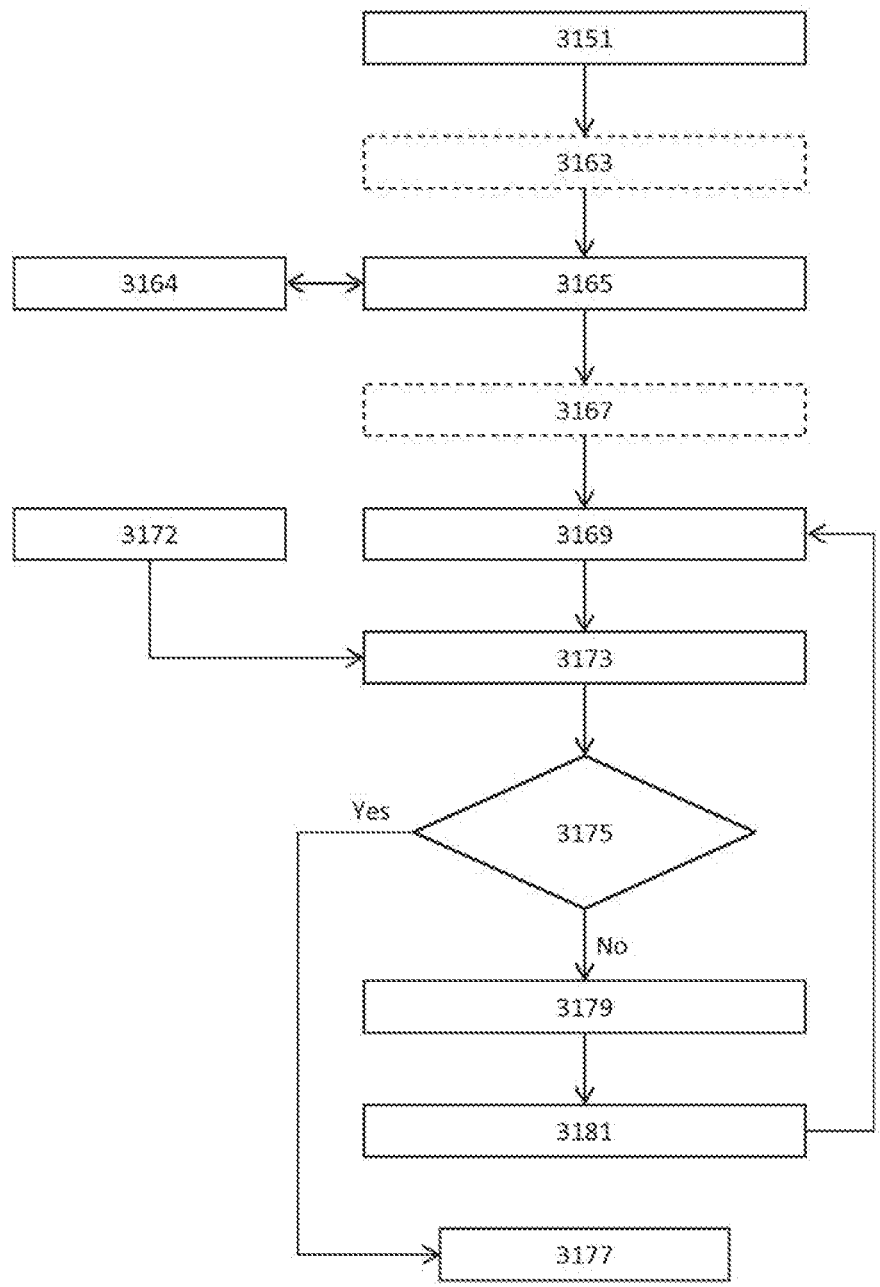
FIG. 5 is a schematic diagram showing the steps taken/flow of data in relation to a method of welding according to a third embodiment of the invention.

A method of joining pipe sections will now be described, with reference to FIG. 5, according to a third embodiment of the invention.

The method may employ the use of the apparatus of the first or second embodiments. Thus, a first pipe section comprises the end of a pipeline being laid at sea. The pipeline extends from the seabed into a pipeline laying vessel. At the pipeline laying vessel the end of the pipeline protrudes into the vessel in a substantially vertical orientation; the end of the pipeline being held by clamps. Aboard the pipeline laying vessel a second pipe section undergoes bevelling 3151 in a pipe bevelling machine, having high accuracy and known tolerances. The second pipe section is then loaded 3163 into a J-lay tower where it is held by a pipe positioning system. The pipe section is held in a substantially vertical position above the pipeline.

The pipe section undergoes an initial positioning 3165 relative to the end of the pipeline. The end of the pipeline is held in a fixed position by a Hang Off Clamp and the position of the pipe section is manipulated by the pipe positioning system. The initial positioning 3165 brings the pipe sections, into an end-to-end configuration to define a joint to be welded between the pipe sections. The pipe positioning system moves the pipe section by means of a set of actuators. The actuators are controlled by manual input 3164 from an operator. A control unit is configured to receive the input from the operator and then output corresponding instructions to the actuators to effect the desired movement. The initial alignment by the operator is often imprecise, in terms of achieving pipe alignment, but is sufficient to achieve coupling of the pipes so as to allow the insertion 3167 of an Internal Line Up Clamp (ILUC).

An ILUC is then inserted 3167 into the free end of the pipe section and lowered through the pipes until its lower part is inserted into the pipeline. A set of lower pads on the ILUC are then expanded so it is clamped to the pipeline; the lower pads moving radially outward and engaging with the inner walls of the pipeline.

A weld band is then mounted to the exterior of the pipeline, in the vicinity of the joint to be welded. A carriage is movably mounted to the weld band, the carriage being able to freely traverse the circumference of the pipe, on the weld band. A measurement system (in this case according to the second embodiment of the invention) is mounted to the weld band.

When the measurement system is correctly mounted to measure the joint to be welded, the operator will instruct the control unit to commence measurement 3169 of the external root hi-lo. The control unit instructs the carriage, upon which the measurement apparatus is mounted, to traverse the perimeter of the pipe sections. The backlight casts rays of collimated red light tangentially to the weld joint and the camera captures images of the silhouette of the weld joint. (Light, which is predominantly red in colour has been found to be particularly suited to the application as it reduces noise from ambient lighting.) The images are sent electronically to the control unit for image processing. The control unit includes an image processor for carrying out the image processing. The image processor processes the images and detects the hi-lo "d2" between the outside diameters of the pipe section's bevel noses (the "external root hi-lo") and any gaps between the pipe sections' end faces. The image processor detects the hi-lo and gap by a template matching technique. The technique is based on "a priori" information on the theoretical shape of the bevel contained within a database in the control unit. In another embodiment the image processor detects the hi-lo and gap using a technique based on the recognition of known shapes and geometric parameters from the image.

The measurement system takes external root hi-lo "d2" and gap measurements at a plurality of positions around the weld joint. The control unit associates the measurement with the position on the joint at which it was taken. The control unit is able to "map" the distribution of hi-lo and gap around the weld joint. The uncertainty (or error) in the pipe sections' bevel thicknesses, due to the uncertainty (or error) associated with the bevelling machine, are known and taken into account, in this embodiment being input 3172 into the control unit. The control unit then is able to infer 3173 the maximum hi-lo gap on the internal surfaces of the pipe sections (maximum "internal hi-lo", d3).

The internal hi-lo data, as inferred from the measurements, are then processed by the control unit to ascertain 3175 if the hi-lo and gap is within the required tolerance for welding to take place. The tolerance will be defined by the specific requirements of the pipeline laying procedure for which this method is being employed. For trunkline pipeline an internal hi-lo ("d3") of up to 3 mm is acceptable. For standard SCR applications a hi-lo of up to 1 mm can be tolerated, but more demanding SCP applications can require a hi-lo of less than 0.5 mm and the most demanding can require a hi-lo of 0.2 mm or less (which of course might require finer bevel tolerances and greater accuracy of the camera measurement system to be practical to achieve with this embodiment). In the event that the initial positioning aligns the pipes within the required tolerance, then the operator will be alerted that welding 3177 may take place. However, sufficient alignment for welding is unlikely after only the initial positioning of the pipe sections. In the event that the hi-lo and/or gap measurements are not within tolerance, the measurements are processed by the control unit which calculates 3179 a target position for the pipe section, relative to the end of the pipeline. The target position is a position that, if attained, would render the pipes sections aligned within the required tolerances. There may be more than one possible solution. It may be that the target position is calculated as a speculative amount of movement and rotation of the upper pipe section relative to the lower pipeline, with no absolute certainty that such movement will guarantee success.

Control signals are then sent from the control unit to the pipe positioning system; the control signals specifying the movements of the actuators necessary to achieve the target alignment of the pipe sections, as ascertained. The pipe positioning system then effects 3181 the relative movement of the pipe section as per the target alignment so ascertained.

The achieved hi-lo is verified by repetition of the measurement step. In the event of continued misalignment, further iterations of the steps of: ascertaining a target alignment and effecting the movement of the pipe sections to achieve the target alignment, takes place until the hi-lo and gap meets predetermined criteria (such as meeting satisfactory tolerances) for a given application. The ILUC upper pads are expanded to engage with the inner walls of the pipe section. The residual hi-lo and gap is recorded before welding 3177 and stored electronically by the control unit.

Figure 6A:
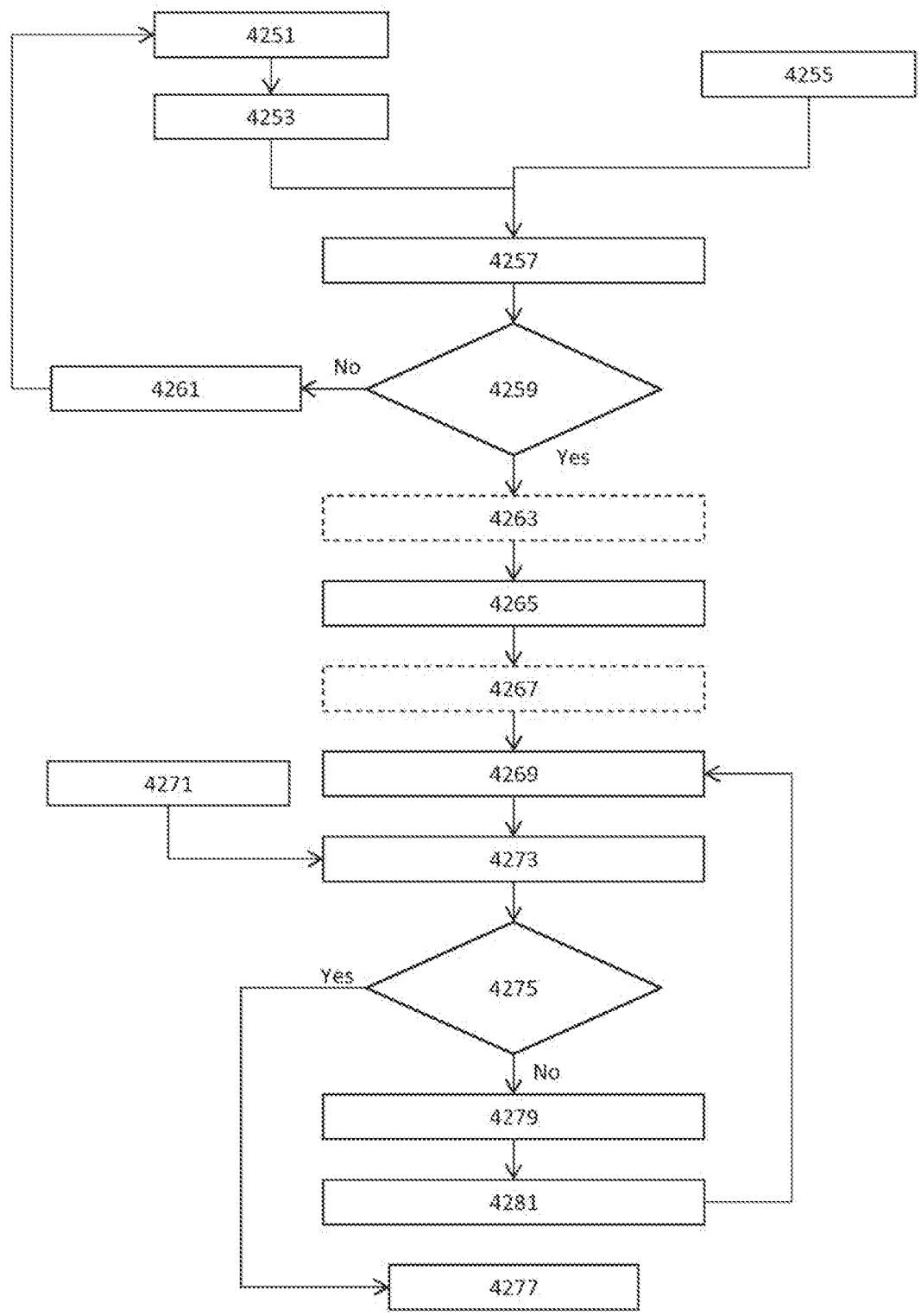
FIGS. 6a and 6b are schematic diagrams showing the steps taken/flow of data in relation to a method of welding pipes together in respect of a fourth embodiment of the invention.
Figure 6B:
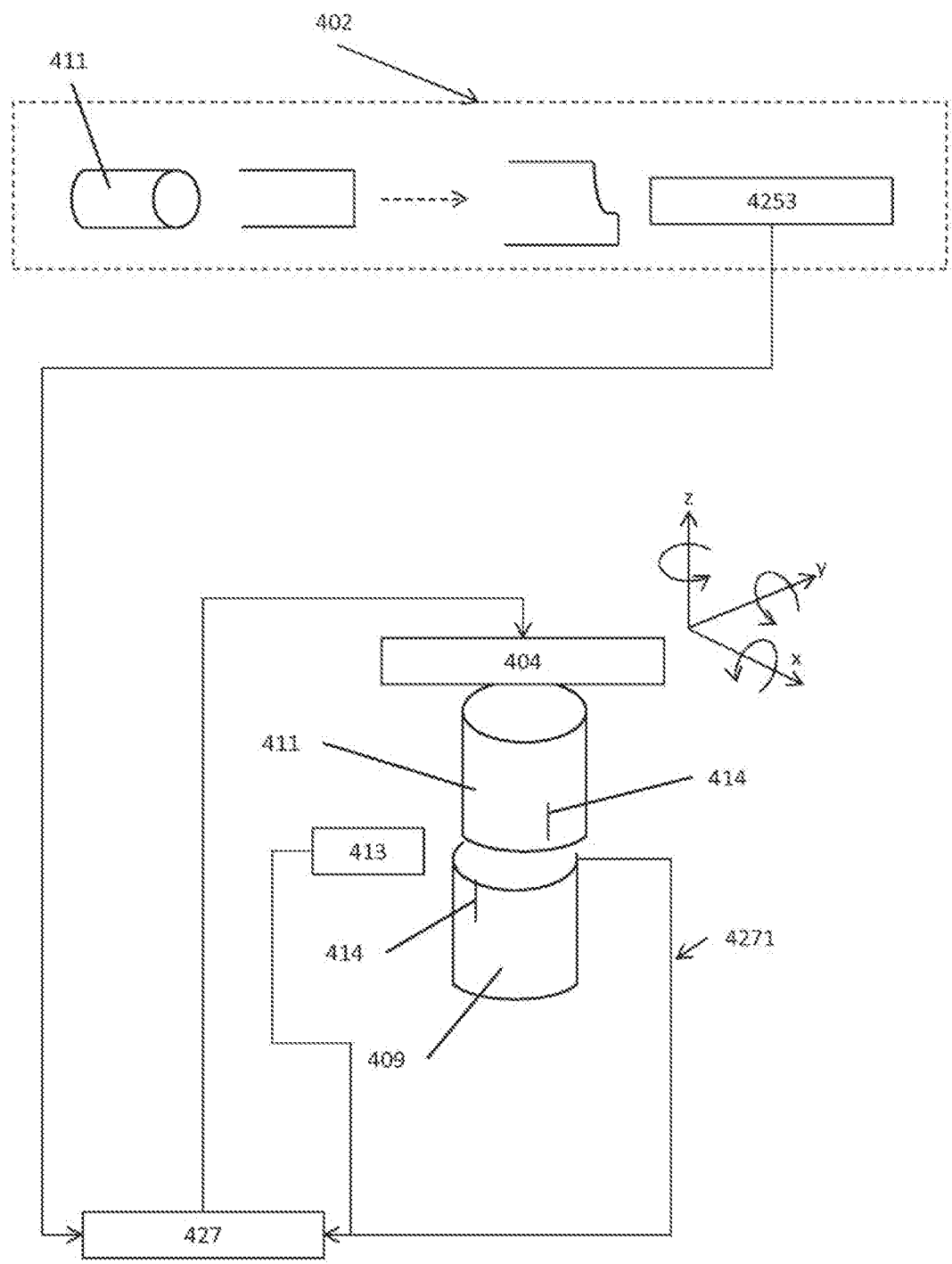

A second method of joining pipe sections will now be described, with reference to FIGS. 6*a* and 6*b*, according to a fourth embodiment of the invention. The fourth embodiment involves the use of geometric information about the pipe section's bevels, the information being acquired outside the J-lay tower. The information about the bevels enables fewer measurements to be made in the J-lay tower and allows a faster, more sophisticated, method of aligning the pipes when in the tower. The second method is suitable for joining a plurality of pipe sections to the end of a pipeline.

According to the fourth embodiment there is provided a first pipe section 409, a second pipe section 411 and a pipe handling apparatus. The first pipe section 409 comprises the end of a pipeline being laid at sea, from a pipeline laying vessel, according to a J-lay method. The second pipe section 411 is provided for the purpose of welding it to the end of the pipeline. The pipe handling apparatus comprises a pipe positioning system 404 and a hi-lo and gap measurement system 413.

The second pipe section undergoes bevelling 4251 in a pipe bevelling machine 402 aboard a pipeline laying vessel. The geometry of the second pipe section's bevels is then measured 4253 by a pipe-end measuring apparatus. The geometric measurements made by the pipe-end measuring apparatus, at a given position on the bevel, include: the radius of the inside edge of the bevel nose and the radius of the exterior edge of the bevel nose. (The radius of the pipe outer diameter can optionally also be measured.) The radius measurements are taken with respect to a location substantially close to the axis of the pipe. Measurements are also made of the axial distance of points on the pipe end face from a reference point. The measurements are acquired at a plurality of positions around the pipe with a laser measuring tool; the laser measuring tool being scanned along the end faces of the second pipe section. In another embodiment, a photographic system may image the end face of the pipe section and the control unit would extract the geometrical parameters from the image. The measurements are acquired at various circumferential positions around the pipe relative to a reference position on the pipe section, a reference marker 414 being added to the pipe in the case where a seam is not present (where a seam is present, the seam can be used as the reference point from which the circumferential position around the pipe is taken). The measurements are then input into a database in a control unit 427.

The geometric data for the end of the first pipe section 409, which constitutes the end of the pipeline, will have previously been acquired 4255 and be present in the control unit's 427 database. The geometric data for the first and second pipe section 409, 411 are processed to ascertain 4257 a target position and angular orientation for the two pipe sections 409, 411 relative to each other. The target position and orientation will aim to maximise the overlap of the end surface of the pipe sections' bevel noses, ensure the distribution of internal hi-lo and the distribution of any gap or gaps between the pipe sections 409, 411 is within the required tolerances for welding, and ensure that seamed pipes are not oriented with their seams unallowably close together.

If the control unit 427 finds no target orientation that can ensure the distribution of hi-lo and/or gap if within the required tolerances 4259 for welding, then the current second pipe section 411 will be rejected 4261. I.e. the bevel geometry of the pipe section is not sufficiently closely matched to the bevel geometry of the end of the pipeline, for the pipe section to be suitable for use as the second pipe section 411. In this case another pipe section will replace the current second pipe section 411, and the above method will be repeated to this point.

An accepted second pipe section 411 is then loaded 4263 in a J-lay tower and the pipe handling apparatus. The control unit 427, which has knowledge of the location of its actuators, will then instruct the pipe positioning system 404 to move 4265 the second pipe section 411, relative to the first pipe section 409, towards its target orientation. The pipe sections will thereafter abut each other in an end-to-end configuration to define therebetween a joint to be welded.

An ILUC is then inserted 4267 into the free end of the second pipe section 411 and lowered to a point, proximal to the joint to be welded, where its lower pads are expanded to engage with the pipeline.

A weld band and measurement system, for example as described above in the first embodiment of the present invention, will typically installed on the first pipe section 409 before the pipe handling apparatus executes its first alignment of the pipe sections 409, 411. The measurement system 413 and control unit 427 are then used, as above, to ascertain 4269 the external root hi-lo d2 and gap d4 at two points, separated by 60 degrees, on the joint to be welded. The angular orientation (about the pipe axis) of the pipe section and pipeline relative to the reference markers is also ascertained 4271 and input into the control system 427. The control unit 427 then calculates 4273, using this information, and the geometric data of the pipe sections' bevels, the hi-lo and gap over the entire circumference of the weld joint, with (a) full knowledge of each pipe end geometry, and (b) their relative rotational positions (about the pipe axis—the z-axis), it may be that only two independent hi-lo and gap measurements, possibly two hi-lo and two gap measurements, need to be taken to ascertain the relative position of the pipes in the x- and y-directions, and possibly to know exactly the relative orientation in three dimensions of the pipe sections. It is then possible to calculate, with the use of the control unit, the hi-lo and gap at any circumferential position using the bevel geometries in memory and the relative positions of the pipe ends as measured (interpolating between measured datum points if required).

The hi-lo and gap distribution is then processed by the control unit 427 to ascertain 4275 whether the pipe sections 409, 411 have achieved their target position. Due to uncertainties in the starting point of the second pipe section 411 and uncertainties in the movement of the actuators in the pipe positioning system 404, the target orientation is likely not to be achieved by the initial pipe positioning. If the target position has been substantially achieved then welding 4277 may take place. If the target orientation has not been achieved sufficiently closely then the control unit calculates 4279 the movements required of the second pipe section 411, relative to the end of the pipeline 409, to achieve the target position. Control signals for carrying out these movements are then sent, from the control unit 427, to the pipe positioning system 404. The pipe positioning system 404 then effects 4281 the repositioning of the second pipe section 411) as per the target position so ascertained.

The achieved hi-lo and gap is verified by repetition of the measurement step 4269. In the event of continued misalignment, further iterations of the steps of: calculating 4279 the movements required to attain the target alignment and effecting 4281 the movement or the pipe sections to achieve the target alignment, takes place until the hi-lo is within a satisfactory tolerance for a given application. The ILUC upper pads are expanded to engage with the inner walls of the second pipe section 411 to help maintain the pipes in the same position. The residual hi-lo and gap is recorded before welding 4277 and stored electronically by the control unit 427.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In a fifth embodiment, a further method of joining pipe sections is used to weld a plurality of pipe sections to form a pipeline. In this further method, a plurality of pipe sections is provided, the pipe sections having been bevelled ready for welding. Comprehensive geometric data for the pipe sections' bevels is provided, in electronic form, with the pipe sections. The pipe sections each have a reference line, which runs parallel to the pipe section's axis, marked on the exterior of the pipe sections. The pipe sections are each marked so that they are individually identifiable. The geometric data is loaded onto database in a control unit.

The control unit uses an algorithm to process the geometric data and calculate the minimum hi-lo for each possible combination of the pipe sections. The algorithm will then suggest a sequence that will minimize the average hi-lo gap across the series of weld joints in the sequence. The algorithm will also output a target orientation for each joint to be welded. The target orientations will be stored in a database for reference by the control unit.

Thereafter, the pipes are loaded into the pipe handling apparatus and are positioned for welding in a substantially similar method as the fourth embodiment of the present invention; the target orientations being called from the database.

In a sixth embodiment of the present invention, a yet further method of joining pipe sections is used to weld a plurality of pipe sections to form a pipeline. In this method, a plurality of pipe sections is provided on-shore, the pipe sections being unbevelled. A pipe-end measuring apparatus is provided and the geometric parameters of the end faces of each pipe section are ascertained. In this embodiment the pipe-end measuring apparatus is a photographic system comprising a camera and control unit. The control unit is configured to ascertain geometrical parameters of the pipe-end face from images of the pipe-end. The geometric parameters so ascertained include measurements of the inner pipe diameter and outer pipe diameter around the pipe section's circumference. The out-of-roundness (OOR) of the pipe ends is determined. Bevelling of the pipes cannot itself correct for the overall geometry (OOR) of the pipe ends. Pre-characterizing the pipes' geometry before bevelling can thus still be useful in marrying up pipes in a way that reduces hi-lo steps. Instead of using a camera-based photographic system, the pipe-end measuring apparatus could alternatively be in the form of a laser measuring tool which is scanned along the end faces of the pipe sections acquiring geometric measurements at a plurality of positions around the pipe, or other distance measuring sensors.)

The control unit is configured to process the geometries of the pipe sections end faces to ascertain an optimal sequence for the pipe sections to be coupled to form a pipeline. The sequence will preferably seek to ascertain an order which will provide the most overlap between adjacent pipe end faces. In the case of seamed pipes, the order also accounts for the fact that seams should be offset by a particular angular separation. The control unit further calculates a sequence with which the pipe sections should be stored in a hold in a particular pipeline laying vessel, the sequence being one which facilitates the quick and convenient removal of the pipe sections from the hold in the order so ascertained for optimal coupling of the pips sections. (It will be appreciated that there may be multiple solutions available for an optimal sequence of coupling of the pipe sections, given a desired minimum degree of misalignment.)

The pipe sections are thus loaded and stored in the hold in the pipeline laying vessel in accordance with the sequence so ascertained. Thereafter, the pipe sections are retrieved from the hold in an order that facilitates quick and convenient coupling of the pipe sections. The retrieved pipe sections are then bevelled and positioned ready for welding in a substantially similar method as the second, or alternatively the fourth, embodiment of the present invention.

Another method of joining pipe sections will not be described according to a seventh embodiment of the present invention. According to the seventh embodiment a first pipe section and a second pipe section are aligned, by a pipe handling apparatus, in an end-to-end configuration prior to welding. Four measurement systems take measurements of the pipe alignment at four fixed and evenly spaced points around the circumference of the pipes, the measurement systems themselves also being fixed in position. An advantage of using fixed measurement systems is that it reduces the need for moving parts and/or motors in the system. (In another embodiment a single measurement system may be moved between the four points to take the measurements.) The measurement system is a backlight camera system (as substantively described in above embodiments, in another embodiment a laser measurement system may be used)

which creates a silhouette image of the joint between the pipe sections. A control unit ascertains hi-lo and gap from these images. The measurements will be compared with a set of tolerances defining the maximum allowable hi-lo and gap for welding of the pipes. The tolerances will depend on the particular application of the present method.

Depending on the alignment (hi-lo and gap) so measured at the four locations, and the tolerances required, the control unit ascertains a direction and magnitude for the movement of the second pipe section relative to the first pipe section to improve the pipe sections' alignment. The pipe handling apparatus will then effect the movement so ascertained. The steps of ascertaining the pipe alignment and moving the second pipe section relative to the first pipe section are then repeated until the pipes are aligned within the tolerances required. Measurements could be made at more than four fixed locations whilst still benefiting from the simplicity of this embodiment.

Here in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of moving a pipe section into a position ready for welding to a pipeline, the method being performed at sea when laying the pipeline to the sea-bed, wherein the method comprises:

holding one end of the pipeline within a J-lay tower on a pipe-laying vessel, the pipeline having a free end which is bevelled ready for welding, the geometry of the bevelled free end of the pipeline having been characterised and stored in the memory of a control unit, providing the pipe section having a free end which is bevelled ready for welding, making measurements of the bevelled free end of the pipe section while the pipe section is outside the J-lay tower, characterising and storing in the memory of the control unit the geometry of the bevelled free end of the pipe section with the use of such measurements, the control unit calculating, using the stored characterisations of the geometry of the bevelled free ends of the pipeline and pipe section, a target orientation that lines up the bevelled free ends of the pipeline and the pipe section, and the control unit determining, prior to moving the pipe section into the J-lay tower, whether or not the geometry of the free end of the pipe section is sufficiently closely matched to the geometry of the free end of the pipeline for the pipe section to be suitable for welding to the pipeline, the geometry not being sufficiently closely matched if the control unit calculates that the pipe section and the pipeline cannot be aligned in a way that would meet a predetermined criteria for maximum and/or average hi-lo values between the beveled free ends of the pipe section and the pipeline;

effecting movement of the pipe section, determined to be suitable, relative to the pipeline in dependence on the target orientation so calculated and bringing the pipe section and the pipeline into contact in a position ready for welding the two free ends together, the two free ends thereby defining a joint to be welded; and measuring, using a measurement system positioned outside the pipe section, a hi-lo value at a plurality of locations on the outer profile of the joint to be welded, the plurality of locations each being at a different angular position around the joint to be welded;

wherein the measurement system includes an imaging camera and a light source and measuring the hi-lo value includes illuminating the joint to be welded with the light source, viewing the joint to be welded with the imaging camera in a tangential direction and capturing, with the imaging camera, an image of a silhouette of the joint to be welded, wherein the hi-lo value can be measured in the image.

2. A method of moving a pipe section into a position ready for welding to a pipeline, the method being performed at sea when laying the pipeline to the sea-bed, wherein the method comprises:

holding one end of the pipeline within a J-lay tower on a pipe-laying vessel, the pipeline having a free end which is bevelled ready for welding, the geometry of the bevelled free end of the pipeline having been characterised and stored in the memory of a control system, providing the pipe section having a free end which is bevelled ready for welding, making measurements of the bevelled free end of the pipe section, characterising and storing in the memory of a control system the geometry of the bevelled free end of the pipe section with the use of such measurements, the control unit calculating, using the stored characterisations of the geometry of the bevelled free ends of the pipeline and pipe section, a target orientation that lines up the bevelled free ends of the pipeline and the pipe section, effecting movement of the pipe section relative to the pipeline in dependence on the target orientation so calculated and bringing the pipe section and the pipeline into contact in a position ready for welding the two free ends together, the two free ends thereby defining a joint to be welded, and measuring, using a measurement system positioned outside the pipe section, a hi-lo value at a plurality of discrete locations on the outer profile of the joint to be welded when the free ends of the pipeline and pipe section are in an end-to-end configuration, the discrete locations each being at a different angular position around the joint to be welded, the control unit using the measured hi-lo values and the stored characterisations of the geometry of the bevelled free ends of the pipeline and pipe section to calculate one or more hi-lo values at one or more further locations around the joint to be welded, the one or more further locations each having an angular position around the joint to be welded different to the angular positions of the discrete locations at which the measurements of the hi-lo value are taken.

3. A method according to claim 2, wherein the hi-lo value is measured in ten or fewer angular positions around the joint to be welded.

4. A method according to claim 1, comprising the control unit using the measured hi-lo values and the stored characterisations of the geometry of the bevelled free ends of the pipeline and pipe section to calculate one or more hi-lo values at one or more further locations around the joint to be welded,
- the one or more further locations each having an angular position around the joint to be welded different to the angular positions of the locations at which the measurements of the hi-lo value are taken.

5. A method according to claim 2, wherein the step of the control unit calculating the target orientation uses the stored characterisations of the geometry of the bevelled free ends of the pipeline and pipe section and the measured hi-lo values to determine the relative orientation of the pipeline and pipe section.

6. A method according to claim 2, wherein the measurement system includes an imaging camera and the step of measuring the hi-lo value includes viewing the joint to be welded with the imaging camera in a tangential direction.

7. A method according to claim 2, wherein the measurement system includes an imaging camera and a light source and the step of measuring the hi-lo value includes illuminating the joint to be welded and capturing with the imaging camera an image of a silhouette of the joint to be welded at each of a plurality of locations around the circumference of the joint to be welded, wherein an external root hi-lo value can be measured in the image.

8. A method according to claim 2, further comprising a step of measuring any gap or gaps between the end faces of the pipeline and the pipe section at the joint to be welded.

9. A method according to according to claim 1, wherein the method includes a step, performed after the step of effecting movement of the pipe section relative to the pipeline in dependence on the target orientation, of verifying the achieved alignment by ascertaining the degree of alignment of the pipe sections.

10. A method according to claim 9, wherein
- the method includes a step of welding together the pipe section and the pipeline, and wherein
- after the achieved alignment has been verified, the pipe section is not moved relative to either the free end of the pipeline or the J-lay tower until after the welding step has been completed.

11. A method according to claim 9, wherein there is a subsequent step, performed when the achieved alignment is deemed not acceptable when performing the step of verifying, of further repositioning the pipe section relative to the free end of the pipeline.

12. A method according to claim 1, wherein the method includes determining a sequence by which a plurality of pipe sections are to be welded to the end of the pipeline in dependence on the geometry of the ends of the pipe sections, the sequence being determined before any of the plurality of pipe sections are moved to within the J-lay tower.

* * * * *